(12) United States Patent
Asano et al.

(10) Patent No.: US 9,239,420 B2
(45) Date of Patent: Jan. 19, 2016

(54) LIGHT GUIDE PLATE, SURFACE SOURCE DEVICE AND TRANSMISSION-TYPE DISPLAY DEVICE

(71) Applicant: DAI NIPPON PRINTING CO., LTD., Tokyo (JP)

(72) Inventors: Eiji Asano, Tokyo (JP); Hiroshi Yamamoto, Tokyo (JP); Masahiro Goto, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 14/339,559

(22) Filed: Jul. 24, 2014

(65) Prior Publication Data

US 2015/0029745 A1    Jan. 29, 2015

(30) Foreign Application Priority Data

Jul. 26, 2013  (JP) ................................ 2013-156024
Sep. 3, 2013   (JP) ................................ 2013-182598
Mar. 14, 2014  (JP) ................................ 2014-051545

(51) Int. Cl.
*F21V 8/00* (2006.01)

(52) U.S. Cl.
CPC .............. *G02B 6/0038* (2013.01); *G02B 6/005* (2013.01); *G02B 6/0058* (2013.01); *G02B 6/002* (2013.01); *G02B 6/0016* (2013.01)

(58) Field of Classification Search
CPC ................ G02F 2001/133607; G02B 6/0016; G02B 6/002; G02B 6/001
USPC ........ 362/97.1–97.4, 620, 625, 626, 610, 619
See application file for complete search history.

(56) References Cited

U.S. PATENT DOCUMENTS 4,373,282  A  *  2/1983  Wragg ................. G02B 6/0036
                                                   362/625
5,584,556  A  *  12/1996 Yokoyama ........... G02B 6/0036
                                                   349/62

(Continued)

FOREIGN PATENT DOCUMENTS

JP      09-043433 A1    2/1997
JP      09-166713 A1    6/1997

(Continued)

OTHER PUBLICATIONS

Japanese Office Action (Application No. 2013-156024) dated Oct. 14, 2014 (with English translation).

(Continued)

*Primary Examiner* — Anabel Ton
(74) *Attorney, Agent, or Firm* — Burr & Brown, PLLC

(57) ABSTRACT

A light guide plate 13 has a number of back surface-side unit optical structures 131 arranged in a back surface 13d along a light guide direction. Each back surface-side unit optical structure 131 is tapered in a direction away from a light exit surface 13c, and has a first inclined surface 132 lying on the light entrance surface side, a second inclined surface (133) lying opposite the first inclined surface and which totally reflects at least part of incident light, and a top surface region 134 lying between the first inclined surface 132 and the second inclined surface 133, and located farthest from the light exit surface 13c. The top surface regions 134 each include a plurality of surfaces 134a to 134d which are parallel to the light exit surface 13c and have different heights "h" in the direction away from the light exit surface 13c.

13 Claims, 10 Drawing Sheets

(56) References Cited

U.S. PATENT DOCUMENTS

| | | | |
|---|---|---|---|
| 5,980,054 A * | 11/1999 | Fukui | G02B 6/0036 362/19 |
| 6,068,382 A * | 5/2000 | Fukui | G02B 6/0036 362/19 |
| 7,085,060 B2 * | 8/2006 | Matsushita | G02B 5/021 349/112 |
| 7,131,764 B2 * | 11/2006 | Hsu | G02F 1/133615 362/615 |
| 7,559,683 B2 * | 7/2009 | Lee | G02B 6/0036 362/606 |
| 8,113,705 B2 * | 2/2012 | Kim | G02B 6/0038 349/64 |
| 8,770,814 B2 * | 7/2014 | McCollum | F21V 5/00 362/603 |
| 2002/0001189 A1 | 1/2002 | Egawa et al. | |
| 2005/0243575 A1 * | 11/2005 | Kunimochi | G02B 6/0038 362/606 |
| 2011/0109533 A1 | 5/2011 | Suzuki | |
| 2012/0201045 A1 | 8/2012 | Gotou et al. | |
| 2013/0336005 A1 | 12/2013 | Chen et al. | |

FOREIGN PATENT DOCUMENTS

| | | |
|---|---|---|
| JP | 2000-227522 A1 | 8/2000 |
| JP | 2002-025320 A1 | 1/2002 |
| JP | 2005-259361 A1 | 9/2005 |
| JP | 2007-227405 A1 | 9/2007 |
| JP | 2012-164583 A1 | 8/2012 |
| JP | 2013-258147 A1 | 12/2013 |
| JP | 2014-038747 A1 | 2/2014 |
| WO | 2009/157352 A1 | 12/2009 |

OTHER PUBLICATIONS

Japanese Office Action (Application No. 2013-182598) dated Oct. 14, 2014 (with English translation).

Japanese Office Action (Application No. 2013-156024) dated Dec. 9, 2014 (with English translation).

* cited by examiner

LIGHT GUIDE PLATE, SURFACE SOURCE DEVICE AND TRANSMISSION-TYPE DISPLAY DEVICE

TECHNICAL FIELD

The present invention relates to a light guide plate, a surface source device and a transmission-type display device.

BACKGROUND ART

A transmission-type display device is known which illuminates a transmissive display, such as an LCD (Liquid Crystal Display) panel, from the back by means of a surface source device (backlight) to display images.

Surface source devices are roughly classified into direct-light type devices which have a light source disposed right behind an optical member such as an optical sheet, and edge-light type devices which have a light source disposed lateral to an optical member. With a light source disposed lateral to an optical member such as a light guide plate, edge-light type surface source devices have the advantage that they can be designed to be thin as compared to direct-light type surface source devices, and have been widely used in recent years.

In an edge-light type surface source device, a light source is generally disposed in a position facing a light entrance surface which is a side surface of a light guide plate. Light emitted by the light source enters the light guide plate through the light entrance surface, and travels in the light guide plate from the light entrance surface toward the opposite surface in a direction (light guide direction) perpendicular to the light entrance surface while repeating reflection from a light exit surface and the opposite back surface.

The traveling direction of the light is changed e.g. by a diffusion pattern or prism shape, provided in the back surface of the light guide plate, so that the light will gradually exit the light guide plate at various positions on the light exit surface along the light guide direction and travel toward an LCD panel (see, for example, JP 09-43433A1).

DISCLOSURE OF THE INVENTION

When a light guide plate, having a diffusion pattern in the back surface as disclosed in JP 09-43433A1 and JP 2007-227405A1, is used, light is diffused and reflected by the diffusion pattern of the back surface before the light exits the light guide plate. This causes the problems of low convergence of light and low front luminance. Further, when such a light guide plate is used, light will be diffused and reflected in directions other than the light guide direction, which may result in low light guide efficiency. This can cause the problem of the light guide plate appearing dark in a region remote from a light source in the light guide direction.

In view of the above problems, light guide plates, having an array of prism structures or the like provided in the back surface as described in JP 2005-259361A1 and JP 9-166713A1, have recently become widely used. Such a light guide plate does not diffuse/reflect light, and can therefore achieve a high front luminance. In addition, the light guide plate can sufficiently guide light to a region remote from a light source in the light guide direction, and can therefore achieve a good in-plane uniformity of brightness.

However, such a light guide plate, having an array of prism structures or the like provided in the back surface, has the following problems: The tops of the prism structures and the inclined surfaces from which light reflects are susceptible to scratching e.g. during assembling work or transportation. When light from the light entrance surface of the light guide plate falls on a scratched portion, the light will be diffused and reflected, and part of the light exits through the light exit surface. This leads to problems such as lowering of the light guide efficiency and uneven luminance.

A light guide plate has been developed which, in order to prevent the above-described scratching of unit optical structures, has a flat portion in part of each of the unit optical structures, such as prism structures, formed in the back surface of the light guide plate.

However, the flat portions are likely to make close optical contact with a reflective member, such as a reflective sheet, located on the side of the back surface of the light guide plate. Light that has been reflected from a flat portion in close optical contact with the reflective member may exit the light guide plate in a direction different from the optically designed direction, resulting in uneven luminance or a decrease in the brightness of a region remote from a light source.

It is therefore an object of the present invention to provide a light guide plate, a surface source device and a transmission-type display device which have a high in-plane uniformity of brightness.

According to the present invention, the above problems can be solved by the following means. The same reference numerals as used in the below-described embodiment of the present invention are used in the following description to facilitate understanding of the description, but are not intended to limit the invention.

A light guide plate (13) according to the present invention, which is configured to allow light to enter through a light entrance surface, and allow the light to exit through a light exit surface while guiding the light in a light guide direction (X direction), comprises: a light entrance surface (13a) through which light enters; a light exit surface (13c) extending in a direction intersecting the light entrance surface and through which light exits; and a back surface (13d) that opposes the light exit surface, wherein a plurality of back surface-side unit optical structures (131) are arranged in the back surface along the light guide direction, wherein each back surface-side unit optical structure is tapered in a direction away from the light exit surface, and has a first inclined surface (132) lying on the light entrance surface side, a second inclined surface (133) lying opposite the first inclined surface and which totally reflects at least part of incident light, and a top surface region (134) lying between the first inclined surface and the second inclined surface, and located farthest from the light exit surface, and wherein in at least part of the back surface-side unit optical structures, the top surface regions each include a plurality of surfaces (134a to 134d) which are parallel to the light exit surface and have different heights in the direction away from the light exit surface.

In the light guide plate (13) according to the present invention, each back surface-side unit optical structure (131) may have a generally quadrangular cross-sectional shape in a cross-section parallel to both the arrangement direction of the back surface-side unit optical structures and the thickness direction of the light guide plate.

In the light guide plate (13) according to the present invention, the following expression may be satisfied: $0.09 \leq Wc/P1 \leq 0.40$, where Wc is the size, in the arrangement direction of the back surface-side unit optical structures, of a surface (134d) which is one of the plurality of surfaces (134a-134d) of each top surface region (134) and which has the largest height in the direction away from the light exit surface, and P1 is the pitch of the back surface-side unit optical structures.

In the light guide plate (13) according to the present invention, the surface having the largest height (h) in the direction away from the light exit surface may constitute a contact region (134*d*) which is to make contact with a reflective member (14) disposed on the side of the back surface of the light guide plate.

In the light guide plate (13) according to the present invention, the plurality of surfaces (134*a*-134*d*) of each top surface region (134) may be arranged in the arrangement direction of the back surface-side unit optical structures (131), and the surface (134*a*), located closest to the first inclined surface, may have the smallest height in the direction away from the light exit surface, and the height of each surface may increase with distance of the surface from the first inclined surface.

In the light guide plate (13) according to the present invention, the light entrance surface (13*a*) may consist of a single surface, wherein the first inclined surface (132) may lie in an area on which light, traveling in the light guide direction (X direction) from the light entrance surface, does not fall, and the top surface region (134) may have a step-like configuration.

In the light guide plate (13) according to the present invention, the back surface-side unit optical structures (131) each may have a columnar shape and may be arranged in the light guide direction (X direction), with the longitudinal direction being perpendicular to the light guide direction.

In the light guide plate (13) according to the present invention, the ratio Wb/W1, i.e. the ratio of the total size Wb of the first inclined surface (132) and the second inclined surface (133) in the arrangement direction of the back surface-side unit optical structures to the size W1 of each back surface-side unit optical structure (131) in the arrangement direction of the back surface-side unit optical structures, may increase with distance of the back surface-side unit optical structure from the light entrance surface (13*a*).

A surface source device (10) according to the present invention comprises: the light guide plate (13); and a reflective member (14), disposed on the side of the back surface of the light guide plate, for reflecting light, which has exited the light guide plate through the back surface, back toward the light guide plate, wherein the reflective member has fine surface irregularities in a light guide plate-side surface, and has a total reflectance of not less than 90% and a diffuse reflectance in the range of 0.5% to 8%, wherein the top surface region, in at least part thereof, includes a contact region (134*d*) to make contact with the reflective member, and wherein the light guide plate satisfies the following expression: 35%≤S1≤45% where S1 is the ratio (A1/A2) of the total contact area (A1) of the contact regions when the back surface of the light guide plate is placed on a flat plate (T) to the area (A2) of the back surface of the light guide plate.

In the surface source device (10) according to the present invention, the following expression may be satisfied: 35%≤S1+S2≤50% where S2 is the ratio (B1/B2) of the total contact area (B1) of the raised portions of the surface irregularities of the reflective member when the light guide plate-side surface of the reflective member is placed on a flat plate to the area (B2) of the light guide plat-side surface of the reflective member.

In the surface source device (10) according to the present invention, the following expression may be satisfied: 0%<S2<5%

In the surface source device (10) according to the present invention, in the following expression may be satisfied: S3 min/S3max>95% where S3 min and S3max are the minimum and the maximum of S3 which is the ratio (a1/A2) of the contact area (a1) of each contact region (134*d*) when the light guide plate (13) is placed on a flat plate (T), the contact region lying in an effective region from which light can reach a viewer, to the area (A2) of the back surface (13*d*) of the light guide plate.

The surface source device (10) according to the present invention further comprises a light source section (12), provided at a position facing the light entrance surface (13*a*) of the light guide plate, for projecting light onto the light entrance surface; and a deflecting optical sheet (15) provided on the side of the light exit surface of the light guide plate and having the effect of deflecting light, which has exited the light guide plate, into the normal direction of the sheet plane or a direction which makes a small angle with the normal direction.

A transmission-type display device (1) according to the present invention comprises the surface source device (10) and a transmissive display (11) to be illuminated from the back by the surface source device.

The light guide plate, the surface source device and the transmission-type display device according to the present invention have the advantage of high in-plane uniformity of brightness.

DESCRIPTION OF THE PREFERRED EMBODIMENTS

Figure 1:
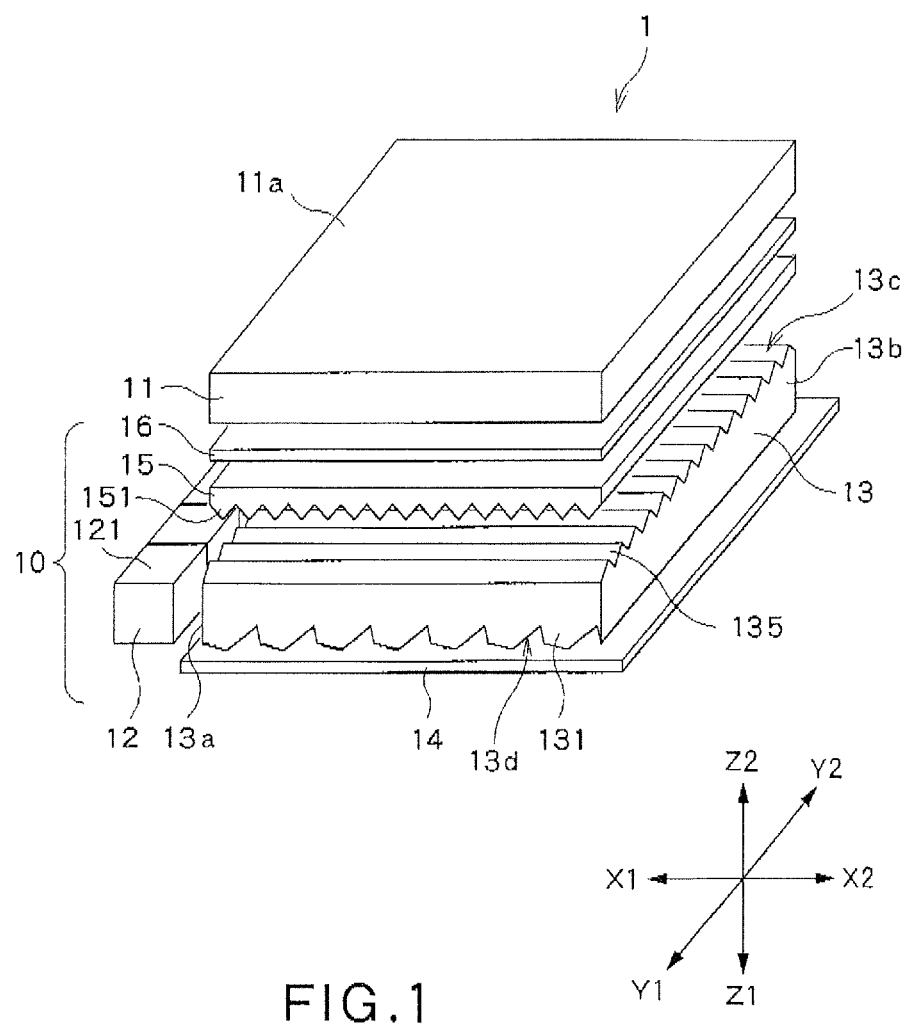
FIG. 1 is a diagram illustrating a transmission-type display device according to an embodiment of the present invention.

Preferred embodiments of the present invention will now be described with reference to the drawings. The following figures, including FIG. 1, are schematic diagrams in which the sizes and shapes of various components may be exaggeratingly modified for easier understanding.

The terms "plate", "sheet" and "film" are not used herein to strictly distinguish them from one another. Thus, the terms may often be interchangeable.

The terms used herein to specify shapes or geometric conditions, such as "parallel", "perpendicular", "same", etc., and the below-described values for length and angle should not be bound to their strict sense, and should be construed to include equivalents or resemblances from which the same function or effect can be expected.

The term "sheet plane (plate plane, film plane)" herein refers to a plane which coincides with the planar direction of an objective sheet (plate, film) when taking a wide and global view of the sheet (plate, film).

Embodiment

FIG. 1 is a diagram illustrating a transmission-type display device 1 according to an embodiment of the present invention.

The transmission-type display device 1 of this embodiment includes an LCD pane 11 and a surface source device 10. The transmission-type display device 1 illuminates the LCD panel 11 from the back by means of the surface source device 10 to display image information formed on the LCD panel 11.

In the following figures, including FIG. 1, and in the following description, the following X-, Y- and Z directions will be referred to for easier understanding: X direction (X1-X2 direction) and Y direction (Y1-Y2 direction) are perpendicular to each other and are both parallel to the screen of the transmission-type display device 1 in use; and Z direction (Z1-Z2 direction) is perpendicular to the screen of the transmission-type display device 1. The Z1 direction is a direction toward a viewer, while the Z2 direction is the opposite direction.

The surface 11a of the LCD panel 11, which is the nearest surface to a viewer (hereinafter referred to as "display surface"), forms the screen of the transmission-type display device 1 of this embodiment. The "front direction" of the transmission-type display device 1 coincides with the normal direction of the display surface 11a, is parallel to the Z direction, and coincides with the normal direction to the sheet plane of the below-described prism sheet 15, the normal direction to the plate plane of the light guide plate 13, etc.

The LCD panel 11 is a transmissive liquid crystal display which forms image information on the display surface. The LCD panel 11 is generally flat plate shaped. When viewed in the Z direction, the LCD panel 11 and the display surface 11a have a rectangular shape with two opposing sides parallel to the X direction and two opposing sides parallel to the Y direction.

The surface source device 10, which illuminates the LCD panel 11 from the back, includes a light source section 12, a light guide plate 13, a reflective sheet 14, a prism sheet 15 and a light diffusing sheet 16. The surface source device 10 is a so-called edge-light type surface source device (backlight).

When viewed in the front direction (Z direction), the light guide plate 13, the reflective sheet 14, the prism sheet 15, the light diffusing sheet 16, etc. have a rectangular shape with two opposing sides parallel to the X direction and two opposing sides parallel to the Y direction.

The light source section 12 is a section which emits light for illuminating the LCD panel 1. The light source section 12 is disposed along the Y direction at a position facing a light entrance surface 13a which is one (X1 side) of the X-direction end surfaces of the light guide plate 13.

The light source section 12 includes a number of point light sources 121 arranged at predetermined intervals in the Y direction. LED (Light Emitting Diode) light sources are used as the point light sources 121. Other types of light sources, for example, a linear light source such as a cold-cathode tube may be used in the light source section 12. Alternatively, the light source section 12 may be comprised of a light guide extending in the Y direction and having a light source disposed at one end. From the viewpoint of increasing the use efficiency of light emitted by the light source section 12, a not-shown reflective plate, covering the periphery of the light source section 12, may be provided.

The light guide plate 13 is a generally flat plate-shaped member for guiding light. In this embodiment the light entrance surface 13a and the opposing surface 13b are located at both ends (X1-side end, X2-side end) of the light guide plate 13 in the X direction and, when viewed in the normal direction (Z direction) to the plate plane of the light guide plate 13, form two parallel sides extending in the Y direction. The plate plane of the light guide plate 13 is parallel to the X-Y plane; and the light exit surface 13c is herein parallel to the plate plane.

The light guide plate 13 allows light, emitted by the light source section 12, to enter through the light entrance surface 13a, and allow the light to gradually exit through the light exit surface 13c toward the prism sheet 15 while subjecting the light to repletion of total reflection from the light exit surface 13c and the back surface 13d and guiding the light in the light guide plate 13 toward the opposing surface 13b, which opposes the light entrance surface 13a, mainly in the X direction (X2 direction).

The light guide plate 13 will now be described in detail. In the following description, the phrase "on the side of the light exit surface 13c" refers to the Z2 side in the Z direction in which the light exit surface 13c and the back surface 13d oppose each other, and the phrase "on the side of the back surface 13d" refers to the Z1 side in the Z direction.

Figure 2:
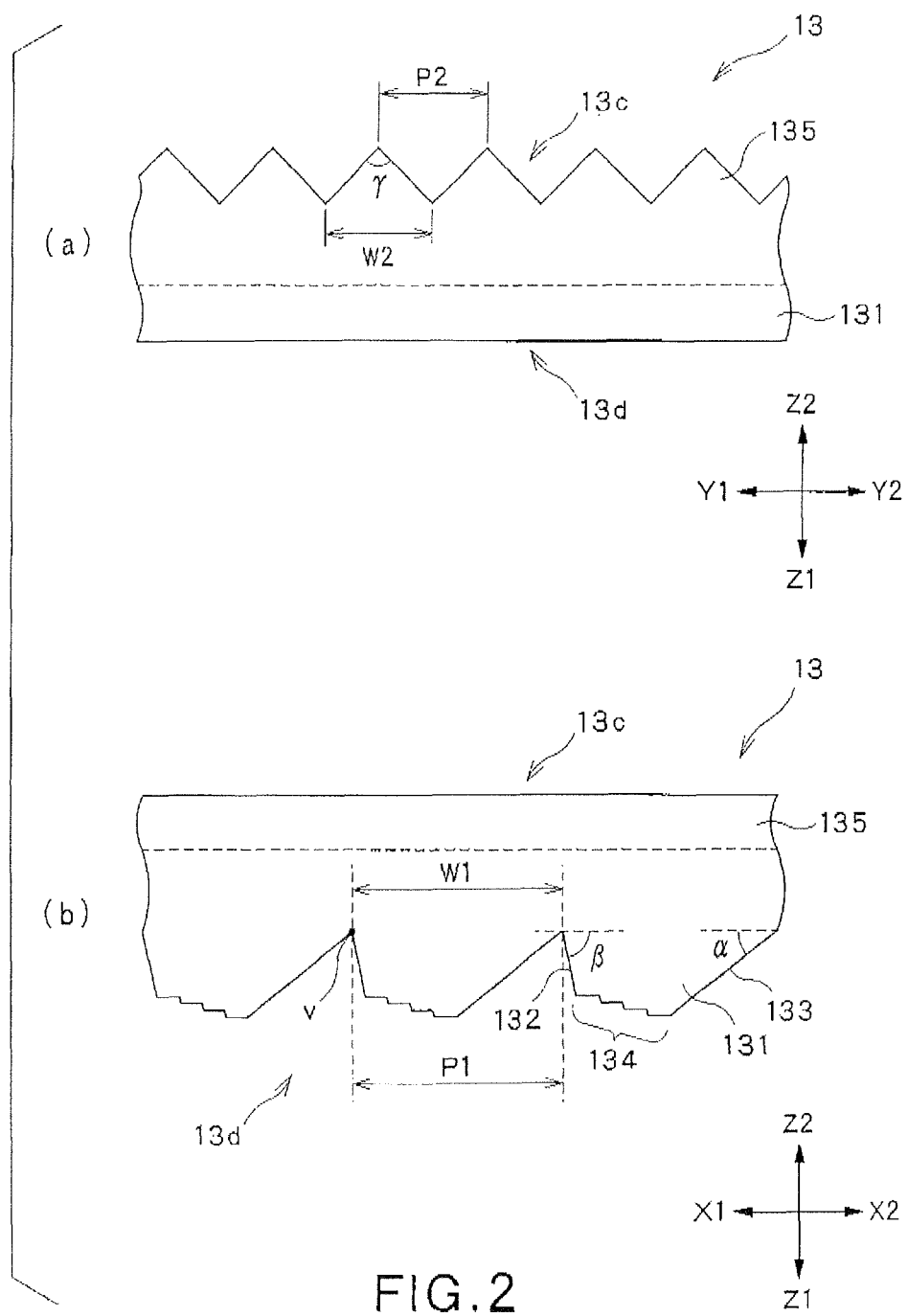
FIG. 2 shows diagrams illustrating the construction of the light guide plate shown in FIG. 1.
Figure 3:
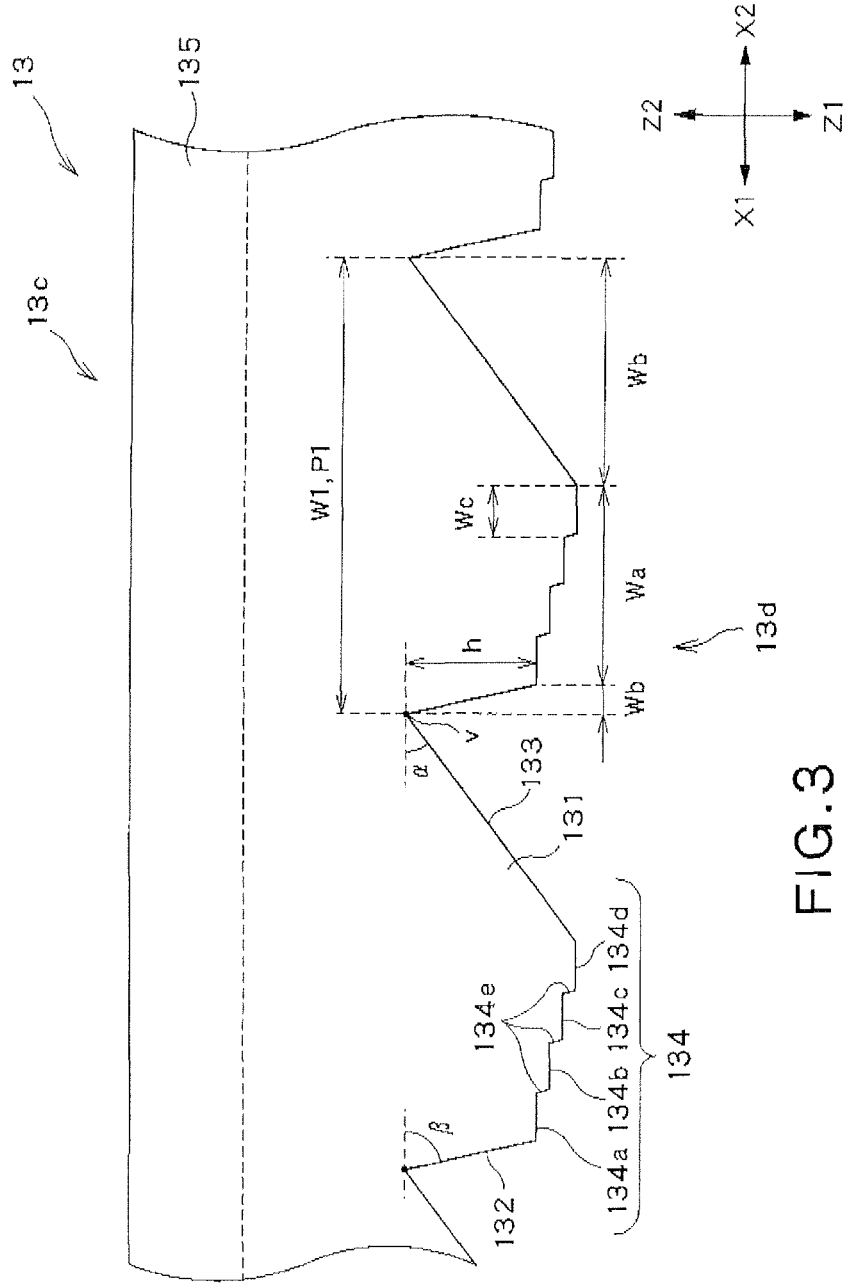
FIG. 3 is a diagram illustrating the construction of the back surface-side unit optical structures shown in FIG. 2.

FIGS. 2 and 3 are diagrams illustrating the shape of the light guide plate 13 of this embodiment. FIG. 2(a) is a cross-sectional diagram in a cross-section parallel to the Y-Z plane, illustrating light exit-side unit optical structures 135. FIG. 2(b) is a cross-sectional diagram in a cross-section parallel to the X-Z plane, illustrating back surface-side unit optical structures 131. FIG. 3 shows an enlarged view of a portion of the light guide plate 13 shown in FIG. 2(b).

As shown in FIG. 2, a number of light exit-side unit optical structures 135 are arranged in the light exit surface 13c of the light guide plate 13, while a number of back surface-side unit optical structures 131 are arranged in the back surface 13d of the light guide plate 13.

As shown in FIGS. 1 and 2(a), each light exit-side unit optical structure 135 has the shape of a triangular prism which is tapered in a direction toward the light exit surface 13c (direction toward the LCD panel 11, Z2 direction), with the longitudinal direction (ridge direction) coinciding with the X direction. The light exit-side unit optical structures 135 are arranged in the Y direction.

As shown in FIG. 2(a), each light exit-side unit optical structure 135 has an isosceles triangular cross-sectional shape with an apex angle γ in a cross-section (Y-Z plane) parallel to the arrangement direction and perpendicular to the plate plane of the light guide plate 13. The light exit-side unit optical structures 135 are arranged with a pitch P2 which is equal to the width W2 of each light exit-side unit optical structure 135 in the arrangement direction (P2=W2).

The pitch P2 is preferably in the range of about 10 to 100 μm. If the pitch P is smaller than the above range, it is difficult to produce the light exit-side unit optical structures 135 as designed. If the pitch P is larger than the above range, moire is likely to occur due to interference between the light exit-side unit optical structures 135 and the pixels of the LCD panel 11. In addition, the pitch of the light exit-side unit optical structures 135 is likely to be perceived during their use in the surface source device 10.

The light exit-side unit optical structures 135 are not limited to the above-described shape: For example, each light exit-side unit optical structure 135 may have the shape of a polygonal column, e.g. having a trapezoidal or pentagonal cross-sectional shape, the shape of part of an elliptical cylinder whose long axis is perpendicular to the plate plane (light exit surface 13c) of the light guide plate 13, the shape of part of a circular cylinder, or a shape composed of a combination of a curved surface(s) and/or a flat surface(s).

The light exit-side unit optical structures 135, which are arranged in the direction (Y direction) perpendicular to the main light guide direction (X direction) of the light guide plate 13, have a light beam control effect in the arrangement direction on light exiting through the light exit surface 13c. Accordingly, the light exit-side unit optical structures 135 can enhance the Y-direction uniformity of brightness of exiting light from the light guide plate 13. When there is no need for such a light beam control effect, the light exit-side unit optical structures 135 may not be formed in the light exit surface 13c.

As shown in FIGS. 1, 2(b) and 3, each back surface-side unit optical structure 131 has a columnar shape which is tapered in the Z1 direction, i.e. in the direction away from the light exit surface 13c, with the longitudinal direction (ridge direction) coinciding with the Y direction. The back surface-side unit optical structures 131 are arranged in the X direction which is the light guide direction.

As shown in FIG. 2(b), each back surface-side unit optical structure 131 has a generally trapezoidal cross-sectional shape in a cross-section (X-Z plane) parallel to the arrangement direction and perpendicular to the plate plane of the light guide plate 13. Each back surface-side unit optical structure 131 has a first inclined surface 132 lying on the light entrance surface side (X1 side), a second inclined surface 133 lying on the opposing surface side (X2 side) and which totally reflects at least part of incident light, and a top surface region 134 lying between the first inclined surface 132 and the second inclined surface 133.

The back surface-side unit optical structures 131 are arranged with a pitch P1 which is equal to the width W1 of each back surface-side unit optical structure 131 in the arrangement direction (P1=W1). In this embodiment the pitch P1 is constant in the arrangement direction.

Each first inclined surface 132 makes an angle β with the plate plane of the light guide plate 13 (plane parallel to the light exit surface 13c, plane parallel to the X-Y plane). Each second inclined surface 133 makes an angle α with the plate plane of the light guide plate 13 (plane parallel to the light exit surface 13c, plane parallel to the X-Y plane). The angles α, β satisfy the relation: α<β.

In each back surface-side unit optical structure 131, the first inclined surface 132 lies on the light entrance surface 13a side, and is inclined such that the opposing surface-side end (top surface region-side end) is away from the light exit surface 13c relative to the light entrance surface-side end in FIG. 2(b). Light which is being guided from the light entrance surface 13a toward the opposing surface 13b (mainly in the X2 direction) little falls on such a first inclined surface 132.

On the other hand, part of light which is being guided in the light guide plate 13 falls on the second inclined surface 133, and at least part of the incident light is totally reflected from the second inclined surface 133. By the total reflection from the second inclined surface 133, the traveling direction of the light is changed so that the angle of the light with respect to the light exit surface 13c (parallel to the X-Y plane) becomes smaller. From the viewpoint of enhancing the uniformity of brightness in the light guide direction and increasing the efficiency of extracting light, it is preferred that the angle α satisfy the expression: $1°<α≤5°$.

If $α≤1°$, upon total reflection of light, traveling in the light guide direction (X direction), from the second inclined surface 133, the change in the angle of the light with respect to the light exit surface 13c (parallel to the X-Y plane) before and after the total reflection is too small. This leads to low light-extracting efficiency: light cannot be extracted in a sufficient amount.

If $α>5°$, upon total reflection of light, traveling in the light guide direction (X direction), from the second inclined surface 133, the change in the angle of the light with respect to the light exit surface 13c (parallel to the X-Y plane) before and after the total reflection is too large. This may cause uneven luminance or a low brightness in a region remote from the light entrance surface 13a. This may also cause a large variation in the direction of exiting light from the light guide plate 13. The light deflecting effect of the below-described prism sheet 15 will therefore be insufficient, resulting in low convergence of light and low front luminance.

As shown in FIG. 3, the top surface region 134 lies between the first inclined surface 132 and the second inclined surface 133. At least part of the top surface region 134 lies at a lower position in the Z direction than the first inclined surface 132 and the second inclined surface 133. In other words, at least part of the top surface region 134 lies farther from the light exit surface 13c than the first inclined surface 132 and the second inclined surface 133.

The top surface region 134 includes a plurality of surfaces (134a, 134b, 134c, 134d) lying at different positions in the Z direction in which the light exit surface 13c and the back surface 13d oppose each other. In other words, the top surface region 134 includes a plurality of surfaces having different heights in the Z1 direction. The "height h of a surface in the Z1 direction" herein refers to the distance to the surface from a plane parallel to the plate plane of the light guide plate 13 (and parallel to the light exit surface 13c) and passing through a point "v" lying at the bottom of the valley between two adjacent back surface-side unit optical structures 131.

For example, the top surface region 134 shown in FIG. 3 includes the surfaces 134a, 134b, 134c, 134d. The surfaces 134a to 134d each extend parallel to the light exit surface 13c (the plate plane of the light guide plate 13), with the longitudinal direction coinciding with the longitudinal direction (Y direction) of the back surface-side unit optical structures 131, and are arranged in the arrangement direction (X direction) of the back surface-side unit optical structures 131. The heights h of the surfaces 134a to 134d are different from each other.

Of the surfaces 134a to 134d, the surface 134a, located closest to the first inclined surface 132 (to the light entrance surface), has the smallest height h. The height h of a surface 134 increases with distance of the surface 134 from the first inclined surface 132; and the surface 134d, located closest to the second inclined surface 133 (to the opposing surface), has the largest height h. The top surface region 134, having such surfaces 134a to 134d, has a step-like configuration in the arrangement direction. The differences in the height h between two adjacent surfaces may be constant or different.

An inclined surface 134e is formed between two adjacent surfaces of the surfaces 134a to 134d. Each inclined surface 134e makes an angle β with the plate plane of the light guide plate 13 (plane parallel to the X-Y plane), and is parallel to the first inclined surface 132.

In this embodiment the surfaces 134a to 134d have the same width in the arrangement direction; however, the surfaces 134a to 134d may have different widths.

Figure 4:
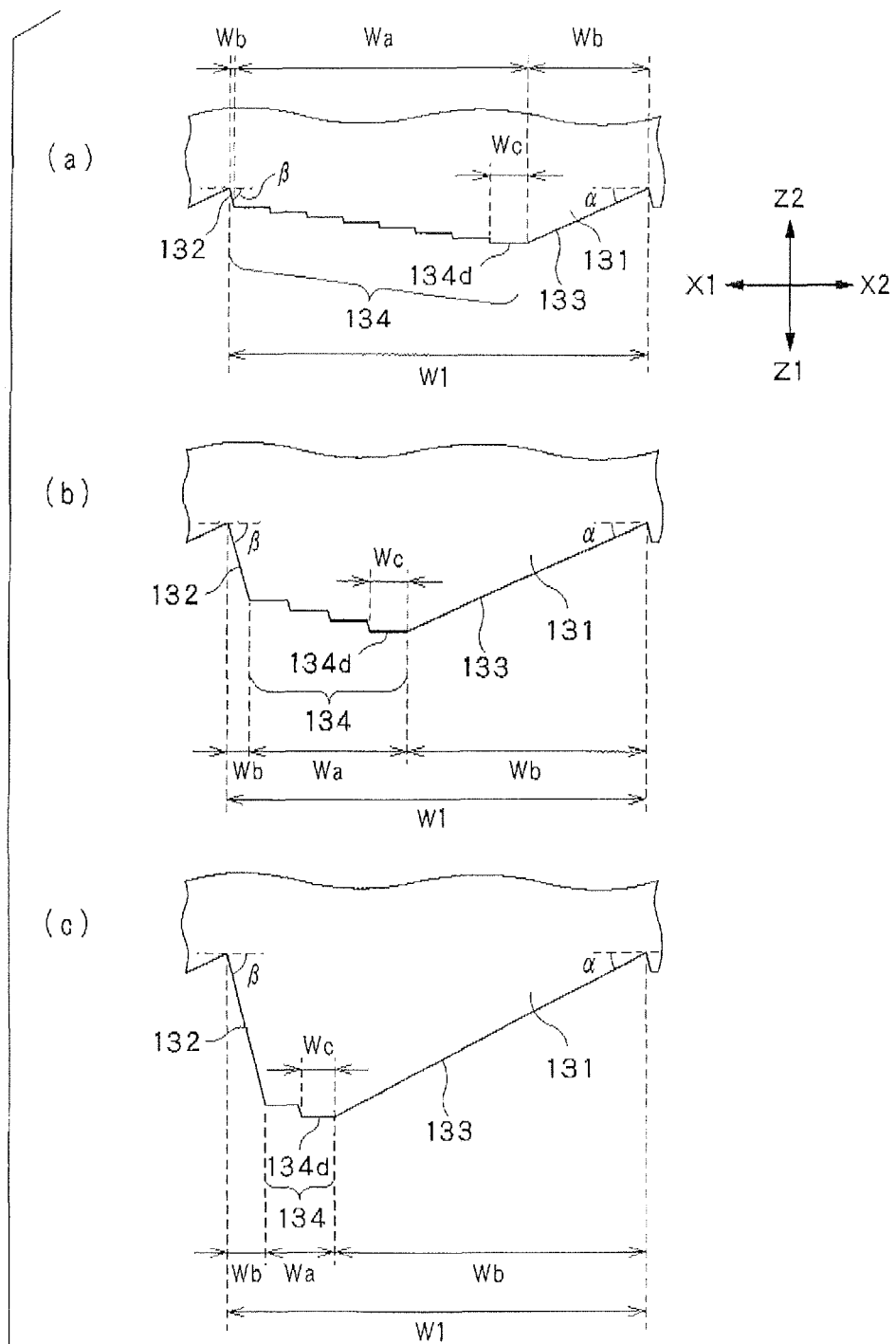
FIG. 4 shows diagrams illustrating the back surface-side unit optical structures shown in FIG. 3 in different portions in the arrangement direction.

FIG. 4 shows diagrams illustrating the back surface-side unit optical structures 131 in different portions in the arrangement direction. FIG. 4(a) shows a back surface-side unit optical structure 131 lying in the vicinity of the light entrance surface 13a, FIG. 4(b) shows a back surface-side unit optical structure 131 lying in the middle in the arrangement direction, and FIG. 4(c) shows a back surface-side unit optical structure 131 lying in the vicinity of the opposing surface 13b.

In FIG. 4, W1 represents the size (width) of a back surface-side unit optical structure 131 in the arrangement direction of the back surface-side unit optical structures 131, Wa represents the size of the top surface region 134, and Wb represents the sum of the size of the first inclined surface 132 and the size of the second inclined surface 133 in the arrangement direction.

The pitch P1, the width W1 and the angles α, β are equal for all the back surface-side unit optical structures 131 in the arrangement direction. However, the ratio Wb/W1, i.e. the ratio of the total size (width) Wb of the first inclined surface 132 and the second inclined surface 133 to the size (width) W1 of a back surface-side unit optical structure 131, increases with distance of the back surface-side unit optical structure 131 from the light entrance surface 13a in the arrangement direction. The ratio Wa/W1, i.e. the ratio of the size (width) Wa of the top surface region 134 to the size (width) W1 of the back surface-side unit optical structure 131, decreases with distance of the back surface-side unit optical structure 131 from the light entrance surface 13a in the arrangement direction.

Thus, as shown in FIG. 4(a), in a back surface-side unit optical structure 131 lying in the vicinity of the light entrance surface 13a (near the light source), the ratio Wa/W1, i.e. the ratio of the size Wa of the top surface region 134 to the width W1 of the back surface-side unit optical structure 131, is large, while the ratio Wb/W1, i.e. the ratio of the total size Wb of the first inclined surface 132 and the second inclined surface 133 to the width W1 of the back surface-side unit optical structure 131, is small.

As shown in FIG. 4(b), the ratio Wa/W1 is smaller and the ratio Wb/W1 is larger in a back surface-side unit optical structure 131 lying closer to the opposing surface 13b. As shown in FIG. 4(c), the ratio Wb/W1 is large and the ratio Wa/W1 is small in a back surface-side unit optical structure 131 lying in the vicinity of the opposing surface 13b.

The ratio of the total width Wb of the two inclined surfaces (especially the second inclined surface 133) to the width W1 of a back surface-side unit optical structure 131 is thus increased with distance of the back surface-side unit optical structure 131 from the light entrance surface 13a. This enables light to exit the light guide plate 13 with good efficiency and can enhance the uniformity of brightness in the light guide direction.

In this embodiment the ratio Wb/W1 is about 20/100 in a back surface-side unit optical structure 131 lying closest to the light entrance surface 13a, and about 80/100 in a back surface-side unit optical structure 131 lying closest to the opposing surface 13b. However, the ratio Wb/W1 may be arbitrarily set according to desired optical performance, etc. within a range in which the lower limit is about 10/100 in the light entrance surface 13a-side unit optical structure 131, and the upper limit is about 90/100 in the opposing surface 13b-side unit optical structure 131.

As described above, the pitch P1 (width W1) and the angles α, β are equal for all the back surface-side unit optical structures 131 and, as shown in FIG. 4, the number of the surfaces constituting the top surface region 134 of a back surface-side unit optical structure 131 is decreased and the ratio of the total width Wb of the two inclined surfaces (especially the second inclined surface 133) to the width W1 of the back surface-side unit optical structure 131 is increased with distance of the back surface-side unit optical structure 131 from the light entrance surface 13a.

However, the size Wa of the top surface region 134 may be adjusted by adjusting the width of each of the surfaces constituting the top surface region 134 while using the same number of top surface region 134—constituting surfaces for all the back surface—side unit optical structures 131.

In the back surface-side unit optical structure 131, lying closest to the opposing surface 13b, and an adjacent back surface-side unit optical structure(s) 131, the width Wa of the top surface region 134 is sufficiently small; close optical contact of the top surface region 134 with the reflective sheet 14 exerts little influence. Therefore, in such a back surface-side unit optical structure(s) 131, the top surface region 134 may consist of one surface.

In the light guide plate 13 of this embodiment, a surface having the largest height h is a contact region with the reflective sheet 14. Thus, the surface 134d shown in FIG. 3 is a contact region.

From the viewpoint of preventing close optical contact between the light guide plate 13 and the reflective sheet 14, it is preferred that the back surface-side unit optical structures 131 satisfy the following expression: $0.09 \leq Wc/P1 \leq 0.40$ where P1 is the pitch of the back surface-side unit optical structures 131, and Wc is the width of the contact region (the surface 134d having the largest height h).

A small Wc/P1 value is effective to prevent close optical contact between the light guide plate 13 and the reflective sheet 14. However, if Wc/P1<0.09, then the small contact region (surface 134d) will be subject to breakage. Further, the production of the light guide plate 13 having such contact regions may be difficult and may require an increased production cost. In addition, it is possible that such contact regions may cause damage to the reflective sheet 14 disposed opposite the back surface 13d.

If Wc/P1>0.40, the area of contact between the light guide plate 13 and the reflective sheet 14 is large because of the large contact region, whereby close optical contact between them is likely to occur.

It is therefore preferred that the ratio Wc/P1 satisfy the expression: $0.09 \leq Wc/P1 \leq 0.40$ As described above, in this embodiment the ratio of the width Wa of the top surface region 134 to the width W1 (pitch P1) of a back surface-side unit optical structure 131 decreases with distance of the back surface-side unit optical structure 131 from the light source section 12 in the arrangement direction. On the other hand, the ratio Wc/P1 is constant or approximately constant along the light guide direction; however, the ratio Wc/P1 may be varied along the light guide direction.

The pitch P1 is preferably in the range of 50 to 300 μm. If the pitch P is smaller than the above range, it is difficult to produce the back surface-side unit optical structures 131 as designed. If the pitch P is larger than the above range, the surfaces 134d as a contact region have a large area, and therefore close optical contact of the surfaces 134d with the reflective sheet 14 is likely to occur. Furthermore, moire is likely to occur. In addition, the pitch of the back surface-side unit optical structures 135 is likely to be perceived during their use in the surface source device 10.

The light guide plate 13 of this embodiment can be produced by a method comprising producing a molding die by machining a mold for shaping the back surface-side unit optical structures 131 e.g. with a turning tool, and subjecting a thermoplastic resin to extrusion or injection molding using the molding die. Any thermoplastic resin can be used if it has a high light transmittance. Examples of usable resins include an acrylic resin, a COP (cycloolefin polymer) resin, a PC resin, etc.

The light guide plate 13 may be produced by other methods, including a method which involves integrally forming, by a UV irradiation method, the back surface-side unit optical structures 131 and the light exit-side unit optical structures 135 in both surfaces of a sheet-like member which has been produced e.g. by extrusion.

Returning to FIG. 1, the reflective sheet 14 is disposed on the side of the back surface (Z1 side) of the light guide plate 13. The reflective sheet 14 is comprised of a sheet-like member capable of reflecting light. The reflective sheet 14 functions to reflect light, coming from the light guide plate 13, back toward the light guide plate 13.

From the viewpoint of increasing the use efficiency of light, etc., the reflective sheet 14 has mirror (specular) reflectivity. In particular, the reflective sheet 14 is designed to have a total reflectance of not less than 90% and a diffuse reflectance in the range of 0.5% to 8%.

Figure 5:
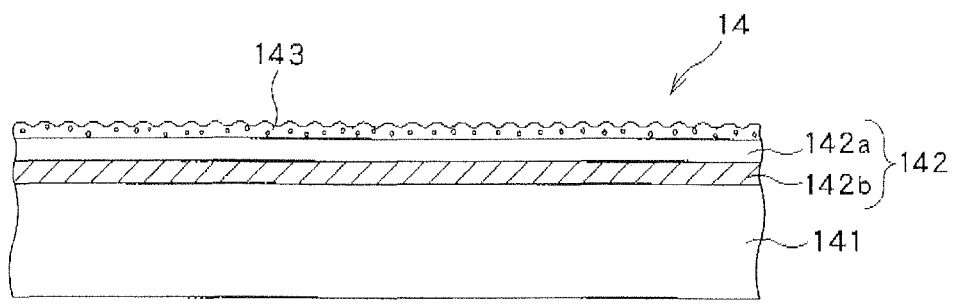
FIG. 5 is a diagram illustrating the construction of the reflective sheet shown in FIG. 1.

FIG. 5 is a diagram showing the cross-sectional shape of the reflective sheet 14. FIG. 5 shows an enlarged view of a portion of the reflective sheet 14 in a cross-section parallel to both a direction (Z direction) perpendicular to the sheet plane of the reflective sheet 14 and the light guide direction (X direction).

As shown in FIG. 5, the reflective sheet 14 comprises a resin substrate layer 141, a reflective layer 142 formed on the light guide layer 13-side surface of the substrate layer 141, and a mat layer 143 formed on the light guide layer 13-side surface of the reflective layer 142.

The substrate layer 141 is a base layer of the reflective sheet 14. A sheet-like member of a PET (polyethylene terephthalate) resin is used for the substrate layer 141. Sheet-like members of other reins, such as a PC resin, an acrylic resin, a PP (polypropylene) resin, a TAC (triacetyl cellulose) resin, etc. may also be used for the substrate layer 141. The substrate layer 141 may be colored, e.g. white, transparent, translucent or opaque.

The reflective layer 142 functions to specularly reflect light, and prevents a decrease in the front luminance of the light guide plate 13 by specularly reflecting light that has exited the back surface 13d of the light quid plate 13 and returning the light to the light guide plate 13. The reflective layer 142 consists of a transparent substrate layer 142a and a vapor-deposited layer 142b. The reflective layer 142 is bonded to the substrate layer 141 with a not-shown adhesive such that the vapor-deposited layer 142b faces the substrate layer 141.

The transparent substrate layer 142a is comprised of a transparent or nearly-transparent sheet-like member of a PET resin. Besides a PET resin sheet-like member, sheet-like members of other reins, such as a PC resin, an acrylic resin, a PP (polypropylene) resin, a TAC (triacetyl cellulose) resin, etc. may also be used for the transparent substrate layer 142a.

The vapor-deposited layer 142b is a layer having a light reflecting function, formed by vapor-depositing a metal material having a high reflectance, such as silver or aluminum, onto one surface of the transparent substrate layer 142a.

It is desirable that the reflective layer 142 have a total reflectance of not less than 90% and a diffuse reflectance Rd of not more than 8%. If the total reflectance is less than 90%, the light reflecting properties of the reflective layer 142 are undesirably low. If the diffuse reflectance Rd exceeds 8%, the specular reflectivity of the reflective layer 142 is undesirably low.

The mat layer 143 is a layer having fine surface irregularities, superimposed on the surface of the transparent substrate layer 142a of the reflective layer 142. The mat layer 143 is formed from a UV curable resin containing fine particles. From the viewpoint of ensuring adhesion to the reflective layer 142, the mat layer 143 is formed not on the vapor-deposited layer 142b but on the transparent substrate layer 142a.

A urethane resin or an epoxy resin, for example, is preferably used as the UV curable resin for the mat layer 143. The content of the fine particles in the UV curable resin may be arbitrarily determined depending on the surface irregularities required for the mat layer 143. Urethane beads having a high impact resilience, for example, can be used as the fine particles. The hardness of the mat layer 143 can also be adjusted by adjusting the content of the fine particles in the UV curable resin. By adjusting the hardness of the mat layer 143 to make it equal or similar to the hardness of the light guide plate 13, the reflective sheet 14 and the light guide plate 13 can be prevented from being damaged when they are stacked on top of each other. The hardness of the mat layer 143 tends to increase with increase in the content of the fine particles, while the hardness of the mat layer 143 tends to decrease with decrease in the content of the fine particles. Besides the above-described urethane beads, other types of beads such as styrene beads, acrylic beads, glass beads, silica beads, etc. may also be used.

From the viewpoint of adjusting the surface irregularities and the hardness of the mat layer 143, the fine particles in the UV curable resin preferably have a particle size in the range of 1 to 30 μm. The thickness of the mat layer 143 in this embodiment refers to the thickness of the layer at a position where no fine particle exists. The mat layer 143 may be formed from the UV curable resin containing no fine particles. In that case, surface irregularities can be formed on the mat layer 143 e.g. by embossing. The mat layer 143 can be made to have a desired hardness e.g. by appropriately selecting the UV curable resin and/or adjusting UV irradiance or the amount of a photopolymerization initiator.

Figure 6:
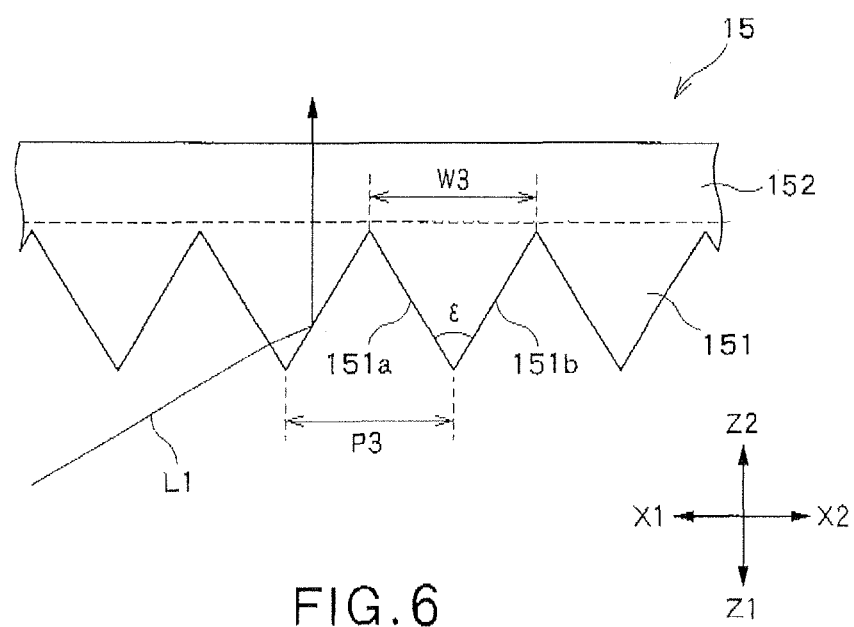
FIG. 6 is a diagram illustrating the construction of the prism sheet shown in FIG. 1.

On the other hand, the prism sheet 15 is disposed in a position adjacent to the light guide plate 13 and nearer to the LCD panel 11 than the light guide plate 13 (see FIG. 1). FIG. 6 is an enlarged view of the prism sheet 15. FIG. 5 shows an enlarged view of a portion of the prism sheet 15 in a cross-section parallel to the X-Z plane. The prism sheet 15 is a deflecting optical sheet which has the effect of deflecting (condensing) light, which has exited the light exit surface 13c of the light guide plate 13, into the front direction (Z direction) or a direction which makes a small angle with the front direction (Z direction).

The prism sheet 15 consists of a prism substrate layer 152 and a number of unit prisms 151 disposed on the side of the light guide plate 13 (Z1 side) of the prism substrate layer 152.

The prism substrate layer 152 is a base (substrate) portion of the prism sheet 15. A sheet-like resin member having the property of transmitting light is used for the prism substrate layer 152.

Each unit prism 151 has the shape of a triangular prism which is tapered in a direction toward the light guide plate 13, with the longitudinal direction (ridge direction) coinciding with the Y direction. The unit prisms 151 are arranged on the back (Z1-side) surface of the prism substrate layer 152 in the X direction. Thus, the arrangement direction of the unit prisms 151 is parallel to the arrangement direction of the back surface-side unit optical structures 131 and perpendicular to the arrangement direction of the light exit-side unit optical structures 135.

The unit prisms 151 of this embodiment each have an isosceles triangular cross-sectional shape with an apex angle E in a cross-section (X-Z plane) parallel to the arrangement direction (X direction) and to a direction (Z direction) perpendicular to the sheet plane of the prism sheet 15. However, the unit prisms 151 are not limited to such a cross-sectional shape: For example, each unit prism 151 may have a scalene triangular cross-sectional shape. At least one surface of each unit prism 151 may be composed of polygonal surfaces or a combination of a curved surface(s) and/or a flat surface(s). The cross-sectional shape of each unit prism 151 may be asymmetric in the arrangement direction.

The unit prisms 151 are arranged with a pitch P3. The width of each unit prism 151 in the arrangement direction is W3. The pitch P3 is equal to the width W3 in the arrangement direction (P3=W3).

The prism sheet 15 allows light L1, which has exited the light guide plate 13 and entered a unit prism 151 through one surface (e.g. surface 151a), to totally reflect from the other surface (e.g. surface 151b), thereby deflecting the light into the front direction (Z direction) or a direction which makes a small angle with the front direction.

The prism sheet 15 can be produced by forming the unit prisms 151 using an ionizing radiation curable resin, such as a UV curable resin, on one surface of the sheet-like prism surface layer 152 of, for example, a PET (polyethylene terephthalate) resin or a PC (polycarbonate) resin.

The prism sheet 15 can also be produced by extrusion of a thermoplastic resin such as a PC resin, an MBS (methyl methacrylate-butadiene-styrene copolymer) resin, an MS (methyl methacrylate-styrene copolymer) resin, a PET resin, a PS (polystyrene) resin, etc.

Returning to FIG. 1, the light diffusing sheet 16 is disposed at a position nearer to the LCD panel 11 than the prism sheet 15. The light diffusing sheet 16 is a sheet-like member having the property of diffusing light.

The use of the light diffusing sheet 16 can achieve the effect of appropriately widening the viewing angle and reducing moire caused e.g. by interference between not-shown pixels of the LCD panel 11 and the unit prisms 151.

The light diffusing sheet 16 may be appropriately selected from general-purpose sheet-like members, having light diffusing properties, according to the optical performance required for the surface source device 10 and the display device 1, the optical properties of the light guide plate 13, etc.

Examples of the light diffusing sheet 16 may include a sheet-like resin member containing a diffusing material, a member consisting of a sheet-like resin substrate and a binder coating containing a diffusing material, provided on at least one surface of the substrate, a microlens sheet consisting of a sheet-like resin substrate and an array of microlenses formed on one surface of the substrate, etc.

For the purpose of preventing close optical contact of the prism sheet 15 with the light diffusing sheet 16 or imparting a light diffusing function to the prism sheet 15, fine irregularities may be formed on the light exit-side (Z2-side) surface of the prism substrate layer 152 of the prism sheet 15. Such irregularities may preferably be provided by e.g. a mat layer formed by coating a binder, containing a bead-like filler, on the surface of the prism substrate layer 152.

Instead of or in addition to the light diffusing sheet 16, a polarization selection reflective sheet, which functions to transmit light in a particular polarization state and reflect light in a different polarization state, may be disposed at a position nearer to the LCD panel 11 than the prism sheet 15. When using such a polarization selection reflective sheet, it is preferred, from the viewpoint of increasing the luminance and enhancing the use efficiency of light, to dispose the sheet such that the transmission axis of the sheet is parallel to the transmission axis of a not-shown polarizer located on the light entrance side (Z1 side) of the LCD panel 11. A "DBEF-series" optical film (Sumitomo 3M Limited), for example, can be used as the polarization selection reflective sheet.

Various other types of optical sheets, such as a lenticular lens sheet, may be used instead of or in addition to the light diffusing sheet 16.

Further, in addition to the above-described polarization selection reflective sheet, various types of optical sheets may be additionally disposed at a position nearer to the LCD panel 11 than the prism sheet 15.

According to this embodiment, the use of the above-described light guide plate 13 can reduce close optical contact between the light guide plate 13 and the reflective sheet 14 and, in addition, can enhance the in-plane uniformity of brightness.

Figure 7:
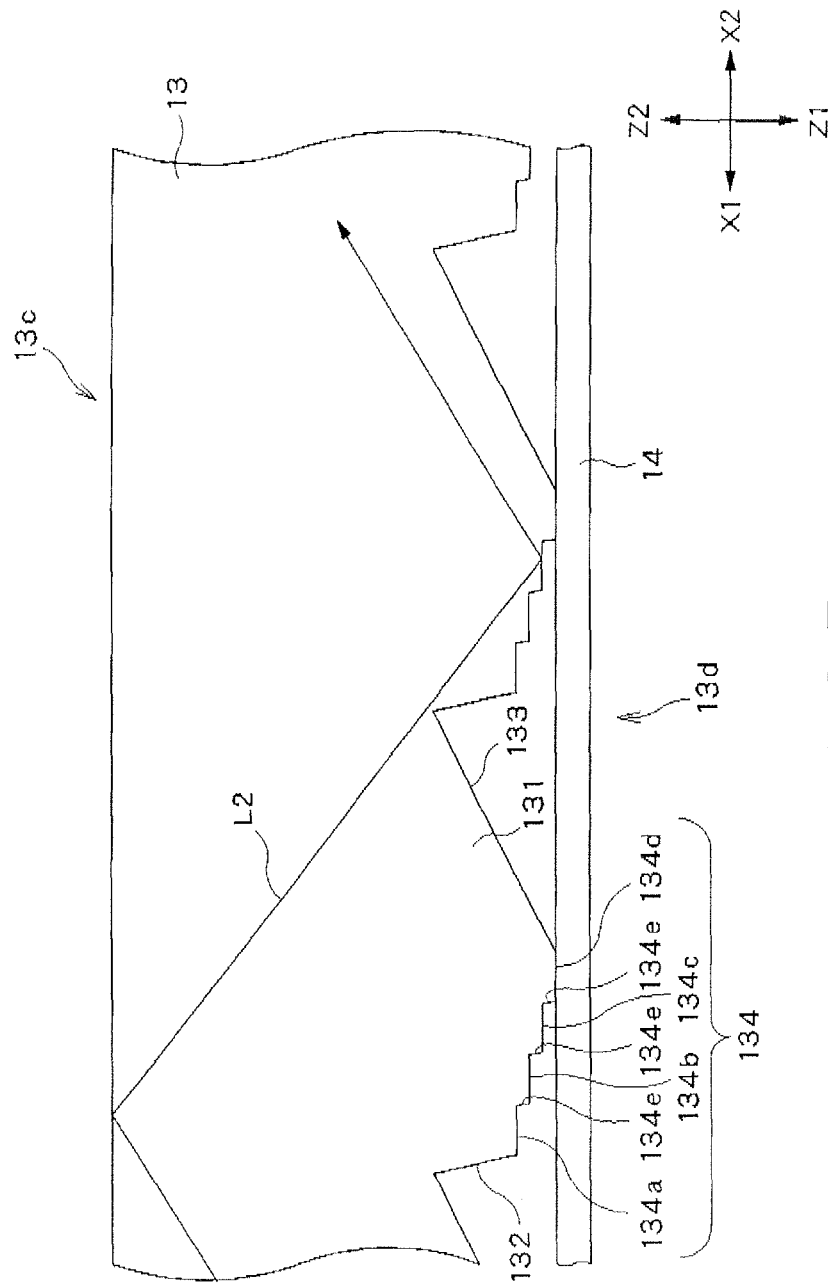
FIG. 7 is a diagram illustrating guiding of light in the light guide plate shown in FIG. 2.
Figure 8:
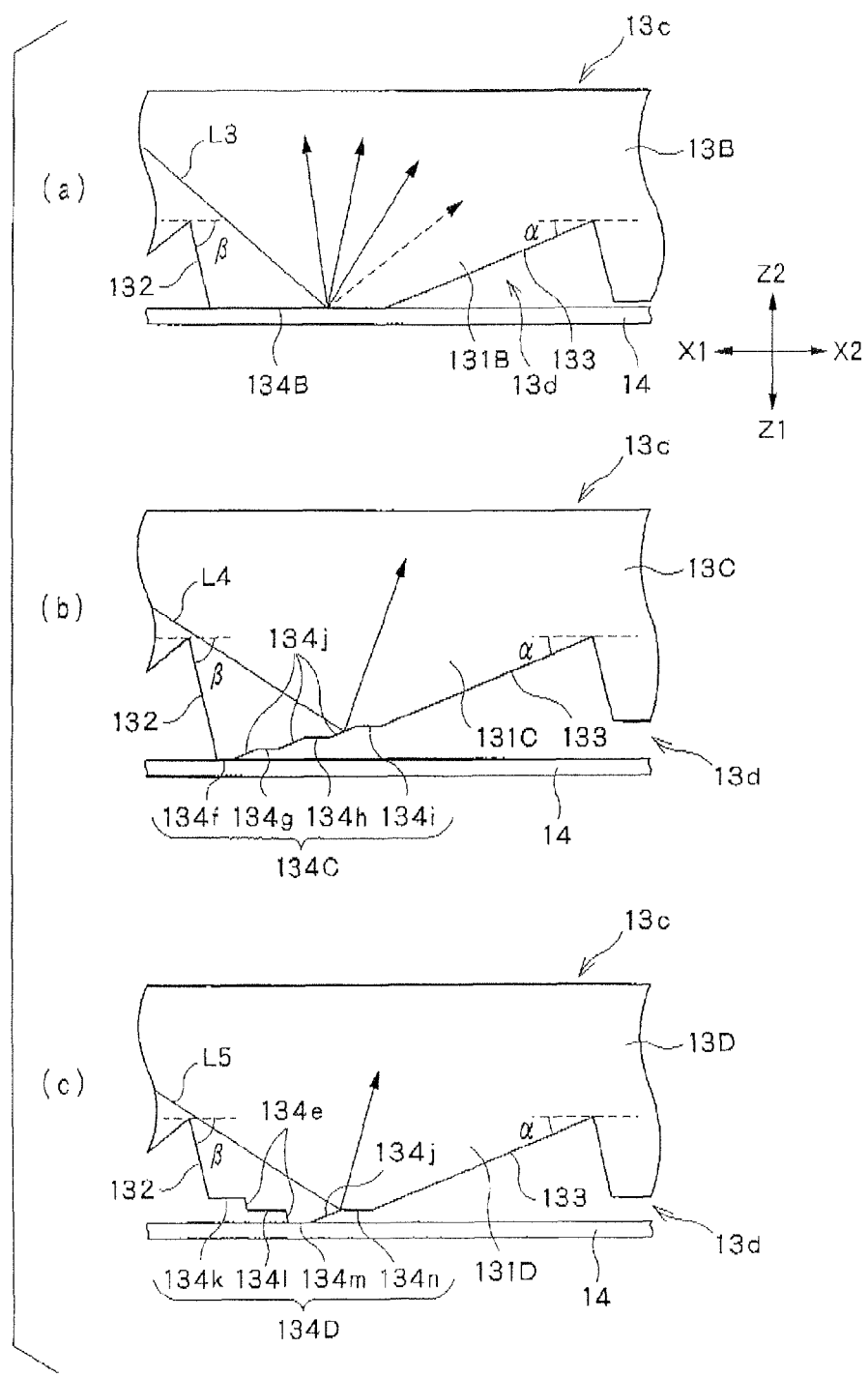
FIG. 8 shows diagrams illustrating guiding of light in light guide plates different from the light guide plate shown in FIG. 7.

The optical action of the light guide plate 13 will now be described with reference to FIGS. 7 and 8. FIGS. 7 and 8 illustrate guiding of light in light guide plates 13, 13B, 13C, 13D. FIG. 7 illustrates guiding of light in the light guide plates 13 shown in FIG. 3; FIG. 8(a) illustrates guiding of light in a comparative light guide plate 13B; FIG. 8(b) illustrates guiding of light in another light guide plate 13C; and FIG. 8(c) illustrates guiding of light in yet another light guide plate 13D. FIGS. 7 and 8(a) through 8(c) each show an enlarged view of a portion of the respective light guide plate and the reflective sheet 14 in a cross-section parallel to the X-Z plane.

The comparative light guide plate 13B shown in FIG. 8(a) has the same construction as the light guide plate 13 of this embodiment shown in FIG. 7 except that the top surface region 134B of each back surface-side unit optical structure 131B consists of a single flat surface parallel to the plate plane (light exit surface 13c) of the light guide plate 13B.

The light guide plate 13C shown in FIG. 8(b) has the same construction as the light guide plate 13 of this embodiment shown in FIG. 7 except that, of the surfaces 134f to 134i of the top surface region 134C of each back surface-side unit optical structure 131C, which are parallel to the light exit surface 13c, the surface 134f, located closest to the first inclined surface 132 (to the light entrance surface) in the arrangement direction, has the largest height in the Z1 direction, and the height of the top surface region 134C decreases stepwise with distance from the first inclined surface 132.

In the light guide plate 13C shown in FIG. 8(b), an inclined surface 134j is formed between adjacent two of the surfaces 134f to 134i. Each inclined surface 134j makes an angle α with a plane parallel to the plate plane (light exit surface 13c) of the light guide plate 13, and is parallel to the second inclined surface 133.

The light guide plate 13D shown in FIG. 8(c) has the same construction as the light guide plate 13 of this embodiment shown in FIG. 7 except that, of the surfaces 134k to 134n of the top surface region 134D of each back surface-side unit optical structure 131D, which are parallel to the light exit surface 134c, the change in the Z1-direction height between the surfaces 134k to 134n is not stepwise but irregular.

In the light guide plate 13D shown in FIG. 8(c), an inclined surface 134e, which makes an angle β with a plane parallel to the light exit surface 13c, is formed between the surface 134k and the surface 134l, lying next to each other in the arrangement direction, and between the surface 134l and the surface 134m, lying next to each other in the arrangement direction, while an inclined surface 134*j*, which makes an angle α with a plane parallel to the light exit surface 13*c*, is formed between the surface 134*m* and the surface 134*n*, lying next to each other in the arrangement direction.

In the comparative light guide plate 13B, the top surface region 134B consists of a single flat surface, and the entire top surface region 134B makes contact with the reflective sheet 14. Therefore, the contact area is large. Especially in a back surface-side unit optical structure 131B lying in the vicinity of the light source section 12, the ratio Wc/P1 can exceed 40%. Close optical contact between the top surface region 134B and the reflective sheet 14 is therefore likely to occur.

Upon close optical contact of the top surface region 134B with the reflective sheet 14, light L3 falling on the top surface region 134B reflects from the reflective sheet 14 without totally reflecting from the top surface region 134B, as shown in FIG. 8(*a*). Accordingly, the reflected light L3 travels in a direction different from the optically designed direction (shown by the broken line in FIG. 8(*a*)), and may exit the light guide plate 13B. Thus, the light guide distance may become shorter than the designed distance. A surface source device including the comparative light guide plate 13B therefore has problems such as uneven luminance due to the presence of locally bright areas, lowering of brightness in a region remote from the light source section 12, etc.

In the light guide plate 13C shown in FIG. 8(*b*), the top surface region 134C of each back surface-side unit optical structure 131C includes the plurality of surfaces. The light guide plate 13C makes contact with the reflective sheet 14 only at the surfaces 134*f* having the largest Z1-direction height. Therefore, compared to the comparative light guide plate 13B, the light guide plate 13C is much less affected by close optical contact with the reflective sheet 14.

As shown in FIG. 8(*b*), however, a certain light ray L4 falls on and totally reflects from an inclined surface 134*j* that makes an angle α with the light exit surface 13*c*, whereby the angle of the light L4 with respect to a plane parallel to the light exit surface 13*c* changes. Thus, the light L4, which is planned to be kept guided in the light guide plate 13C while repeating total reflection from top surface portions parallel to the light exit surface 13*c*, comes to travel in a direction different from the optically designed direction. Therefore, unlike a surface source device including the light guide plate 13 shown in FIG. 7, problems such as uneven luminance due to the presence of locally bright areas, lowering of brightness in a region remote from the light source section 12, etc. can occur in a surface source device including the light guide plate 13C shown in FIG. 8(*b*).

Furthermore, the inclined surfaces 134*j* may be observed as streaks, which can lead to lowering of the appearance of the light guide plate 13C and lowering of the appearance and the optical performance of the surface source device.

In the light guide plate 13D shown in FIG. 8(*c*), the top surface region 134D of each back surface-side unit optical structure 131D includes the plurality of surfaces 134*k* to 134*n*. The light guide plate 13D makes contact with the reflective sheet 14 only at the surfaces 134*m* having the largest Z1-direction height. Therefore, compared to the above-described comparative light guide plate 13B, the light guide plate 13D is much less affected by close optical contact with the reflective sheet 14.

As shown in FIG. 8(*c*), however, a certain light ray L5 falls on and totally reflects from an inclined surface 134*j*, whereby the angle of the light L5 with respect to a plane parallel to the light exit surface 13*c* changes. Thus, the light L5, which is planned to be kept guided in the light guide plate 13C while repeating total reflection from top surface portions parallel to the light exit surface 13*c*, comes to travel in a direction different from the optically designed direction. Therefore, unlike a surface source device including the light guide plate 13 shown in FIG. 7, problems such as uneven luminance due to the presence of locally bright areas, lowering of brightness in a region remote from the light source section 12, etc. can occur in a surface source device including the light guide plate 13D shown in FIG. 8(*c*).

Furthermore, the inclined surfaces 134*j* may be observed as uneven streaks or irregular stripes, which may lead to lowering of the appearance of the light guide plate 13D and lowering of the appearance and the optical performance of the surface source device.

On the other hand, in the light guide plate 13 shown in FIG. 7, the top surface region 134 of each back surface-side unit optical structure 131 includes the plurality of surfaces 134*a* to 134*d*. The light guide plate 13 makes contact with the reflective sheet 14 only at the surfaces 134*d* having the largest Z1-direction height. Further, the ratio Wc/P1 satisfies the following expression: $0.09 \leq Wc/P1 \leq 0.40$.

Therefore, the light quid plate 13 of this embodiment can significantly reduce the influence of close optical contact with the reflective sheet 14.

Further, the Z1-direction height h of the top surface region 134 of each back surface-side unit optical structure 131 increases stepwise with distance from the light entrance surface; the inclined surfaces 134*e*, lying between the surfaces 134*a* to 134*d*, each make an angle β with a plane parallel to the light exit surface 13*c*; and the inclined surface 134*j* that makes an angle α with a plane parallel to the light exit surface 13*c* does not exist. In addition, light which is being guided from the light entrance surface hardly falls on the inclined surfaces 134*e*. Even if light falls on an inclined surface 134*e*, it exerts little influence. Thus, in optical design, the top surface region 134 of this embodiment is approximately the same as a top surface region consisting of a single flat surface.

Therefore, according to the light guide plate 13 shown in FIG. 7, light L2 that has fallen on a top surface region 134 can be totally reflected from the region as desired, and little travels in a direction different from the optically designed direction. It thus becomes possible to provide the light guide plate 13, the surface source device 10 and the transmission-type display device 1 with a high in-plane uniformity of brightness.

Further, because the inclined surface 134*j*, which makes an angle α with a plane parallel to the light exit surface 13*c*, does not exist in the top surface region 134, the light guide plate 13 shown in FIG. 7 has a good appearance.

In addition, according to this embodiment, the ratio of the total width Wb of the two inclined surfaces (especially the second inclined surface 133) to the width W1 of a back surface-side unit optical structure 131 increases with distance of the back surface-side unit optical structure 131 from the light entrance surface 13*a*. This can provide the light guide plate 13 with good light-extracting efficiency and enhanced in-plane uniformity of brightness.

Furthermore, according to this embodiment, the back surface-side unit optical structures 131 are arranged with a constant pitch P1, while the ratio of the total width Wb of the two inclined surfaces (especially the second inclined surface 133) to the width W1 of a back surface-side unit optical structure 131 is varied. This makes it possible to significantly reduce the occurrence of moire (self-moire or moire caused by interference with the unit prisms 151 of the prism sheet 15 or with the pixels of the LCD panel 11).

Experimental Example

An experiment which was conducted on the above-described embodiment will now be described. The particulars of the light guide plate 13, the surface source device 10 and the transmission-type display device 1, which were used in the experiment, are as follows:

LCD panel 11: effective display screen size 294×165 mm

Light guide plate 13: made of acrylic resin, total thickness about 550 μm

Back surface-side unit optical structures 131: pitch P1=100 μm, angle α=2°, angle β=70°, ratio Wb/W1 at the light entrance surface-side end=20/100, ratio Wb/W1 at the opposing surface-side end=80/100, difference in the Z1-direction height between the surfaces of the top surface region=about 0.1 μm Light exit-side unit optical structures 135: pitch P2=50 μm, angle γ=12°

Reflective sheet 14: white PET (polyethylene terephthalate) resin sheet-like member Prism sheet 15: prism substrate layer 152 comprised of a PET resin sheet-like member, thickness 125 μm; unit prisms 151 of UV-curable acrylic resin, apex angle ε=66°, pitch P3=34 μm Light diffusing sheet 16: composed of an acrylic resin (refractive index 1.51) as a matrix and a diffusing material (acrylic resin beads, refractive index 1.49)

The above-described dimensions and materials of the components are merely exemplary, and may be modified or changed depending on the intended optical performance, the usage environment, etc.

The above-described light guide plate 13, surface source device 10 and transmission-type display device 1 were produced and were evaluated for the in-plane uniformity of brightness, etc. As a result, the products were found to have a high in-plane uniformity of brightness without uneven luminance nor moire.

(Evaluation of Close Optical Contact)

Figure 9:
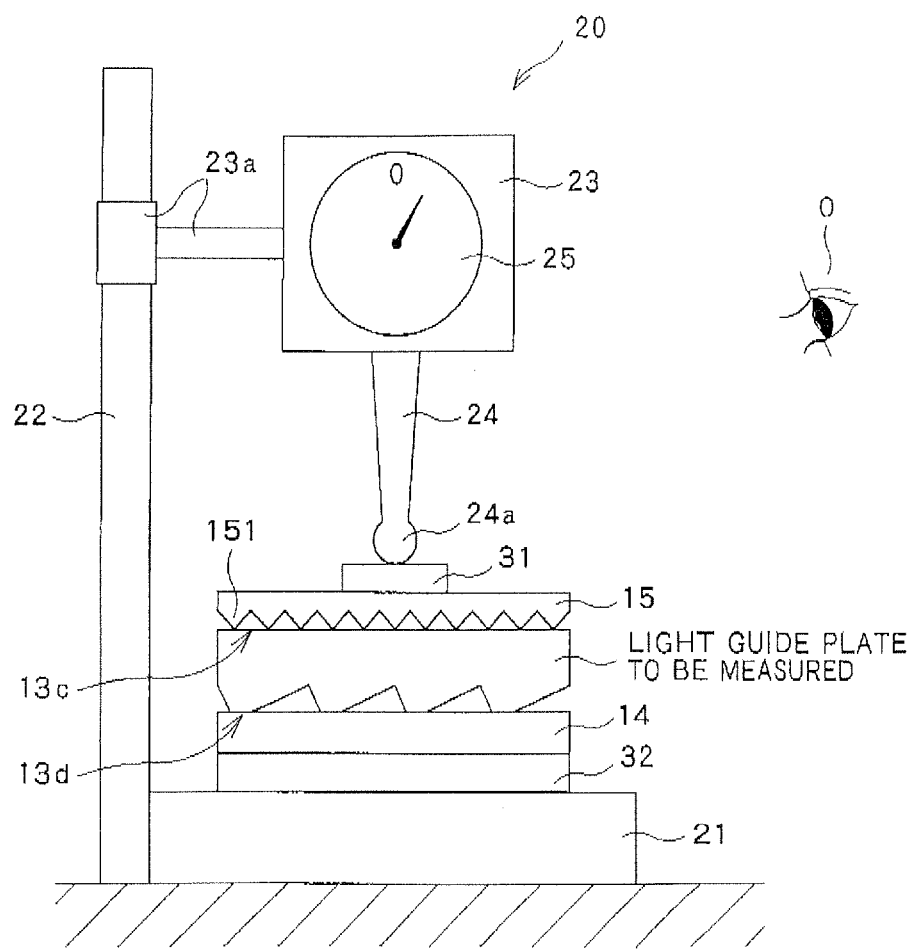
FIG. 9 is a diagram illustrating a method (first evaluation method) for evaluating the occurrence of close optical contact in the light guide plates of Measurement Examples.

Light guide plates 13 of Measurement Examples 1 to 5, having different ratios Wc/P1, were prepared separately and checked for the occurrence of close optical contact. The following is a first method for evaluating the occurrence of close optical contact:

FIG. 9 is a diagram illustrating the first evaluation method for evaluating the occurrence of close optical contact in the light guide plates of the Measurement Examples.

A load measuring device 20 includes a stage 21, a support 22, a main body 23, a terminal 24, a display 25, etc.

The stage 21 is to place a sample on it. The support 22 is a member which extends vertically upward from the stage 21.

The main body 23 supports the terminal 24 which extends vertically downward and the display 25, and applies a predetermined load to the sample. The terminal 24, at its tip 24a, makes contact with the sample, while the display 25 displays the load applied by the main body 23 to the sample. The main body 23 is vertically movable along the support 22 by means of a movement support 23a extending from the main body 23 to the support 22.

A glass plate 32 is placed on the stage 21 of the load measuring device 20, and a stack of a reflective sheet 14, one of the light guide plates of the Measurement Examples and a prism sheet 15 is placed on the glass plate 32. The reflective sheet 14 is disposed on the glass plate 32, and the light guide plate is disposed on the reflective sheet 14, with the back surface 13d of the light guide plate facing the reflective sheet 14. As in the surface source device 10, the prism sheet 15 is disposed on the light exit surface 13c of the light guide plate, with the unit prisms 151 facing the light guide plate, and the arrangement direction of the unit prisms 151 parallel to the arrangement direction of the back surface-side unit optical structures 131.

A glass plate 31 is placed on the prism sheet 15. The glass plate 31 is placed such that when viewed in the normal direction of the light exit surface 13c, the center of the glass plate 31 coincides with the center of the light exit surface 13c of the light guide plate. Further, the tip 24a of the terminal 24 is placed on the center of the glass plate 31, and a predetermined load is applied to the glass plate 31, etc.

An observer O visually observed the areas of contact between the back surface 13d of the light guide plate of each Measurement Example and the reflective sheet 14 at the contact point between the tip 24a and the glass plate 31 and its vicinity through the prism sheet 15 and the glass plate 31 from all directions at a distance of 50 cm from the contact point to check whether irregular stain-like optical defects (wet-out) were observed.

In the case where such optical defects were observed, the light guide plate was determined to be in close optical contact with the reflective sheet 14, which was evaluated as no good. In the case where no such optical defects were observed, the light guide plate was determined to be not in close optical contact with the reflective sheet 14, which was evaluated as good.

The Wc/P1 ratios of the light guide plates which were evaluated for the close optical contact are as follows:

the Wc/P1 ratio of the light guide plate of Measurement Example 1 is 0.09;

the Wc/P1 ratio of the light guide plate of Measurement Example 2 is 0.25;

the Wc/P1 ratio of the light guide plate of Measurement Example 3 is 0.40;

the Wc/P1 ratio of the light guide plate of Measurement Example 4 is 0.50; and the Wc/P1 ratio of the light guide plate of Measurement Example 5 is 0.70.

In all the light guide plates tested, the Wc/P1 ratio is the same for all the back surface-side unit optical structures 131 arranged in the light guide direction.

The light guide plates of the Measurement Examples have the same construction except for the Wc/P1 ratio of the back surface-side unit optical structures 131. The particulars of the members used in the optical contact test are as follows:

Light guide plate: outer size 300 mm×174 mm, made of acrylic resin, total thickness about 550 μm Back surface-side unit optical structures 131: pitch P1=100 μm, angle α=2°, angle β=70°

Light exit-side unit optical structures 135: pitch P2=50 μm, angle γ=120°

Reflective sheet 14: white PET resin sheet-like member, gloss value 60% (JIS Z8741, 60° reflection), outer size 300 mm×174 mm, thickness 150 μm Prism sheet 15: unit prisms 151 of UV-curable resin, pitch P3=50 μm, angle ε=66°; prism substrate layer 152 of PET resin, thickness 188 μm Glass plate 31: 10 mm×10 mm, thickness 5 mm Glass plate 32: 300 mm×174 mm, thickness 2 mm "RX-20" manufacture by Aikoh Engineering Co., Ltd. was used as the load measuring device 20.

Load applied for evaluation of close optical contact: 20 N

Load application area: 100 mm²

It is generally a reflective member, such as the reflective sheet 14, that causes the problem of close optical contact with the back surface 13d of the light guide plate 13. The occurrence of close optical contact with the back surface 13d of the light guide plate 13, not depending on the material of the reflective member, was herein evaluated by the above-described first evaluation method.

The evaluation results are shown in FIG. 1. In Table 1, "O" indicates no occurrence of close optical contact, and "X" indicates relatively poor improvement in the prevention of close optical contact.

TABLE 1

|  | Measurement Example 1 | Measurement Example 2 | Measurement Example 3 | Measurement Example 4 | Measurement Example 5 |
|---|---|---|---|---|---|
| Wc/P1 | 0.09 | 0.25 | 0.40 | 0.50 | 0.70 |
| Evaluation | O | O | O | X | X |

As shown above in Table 1, no close optical contact occurred in the light guide plates of Measurement Examples 1 to 3, having a Wc/P1 ratio of not more than 0.40, whereas the light guide plates of Measurement Examples 4 and 5, having a Wc/P1 ratio of more than 0.40, were relatively poor in improvement in the prevention of close optical contact.

The light guide plate of each Measurement Example was incorporated into a surface source device and a transmission-type display device, which were provided with the white PET resin reflective sheet 14. The devices were evaluated for the in-plane uniformity of brightness, etc. The surface source device and the transmission-type display device, including each of the light guide plates of Measurement Examples 1 to 3, having a Wc/P1 ratio of not more than 0.40, were found to have a very good in-plane uniformity of brightness without uneven brightness. On the other hand, the surface source device and the transmission-type display device, including each of the light guide plates of Measurement Examples 4 and 5, having a Wc/P1 ratio of more than 0.40, were found to be not very good in the in-plane uniformity of brightness, with locally bright and dark areas being present, and poor in the appearance.

As will be appreciated from the foregoing, the light guide plate 13, the surface source device 10 and the transmission-type display device 1 according to this embodiment are significantly improved in close optical contact and have a high in-plane uniformity of brightness.

(Relationship Between the Contact Area of Light Guide Plate and the Contact Area of Reflective Sheet)

Figure 10:
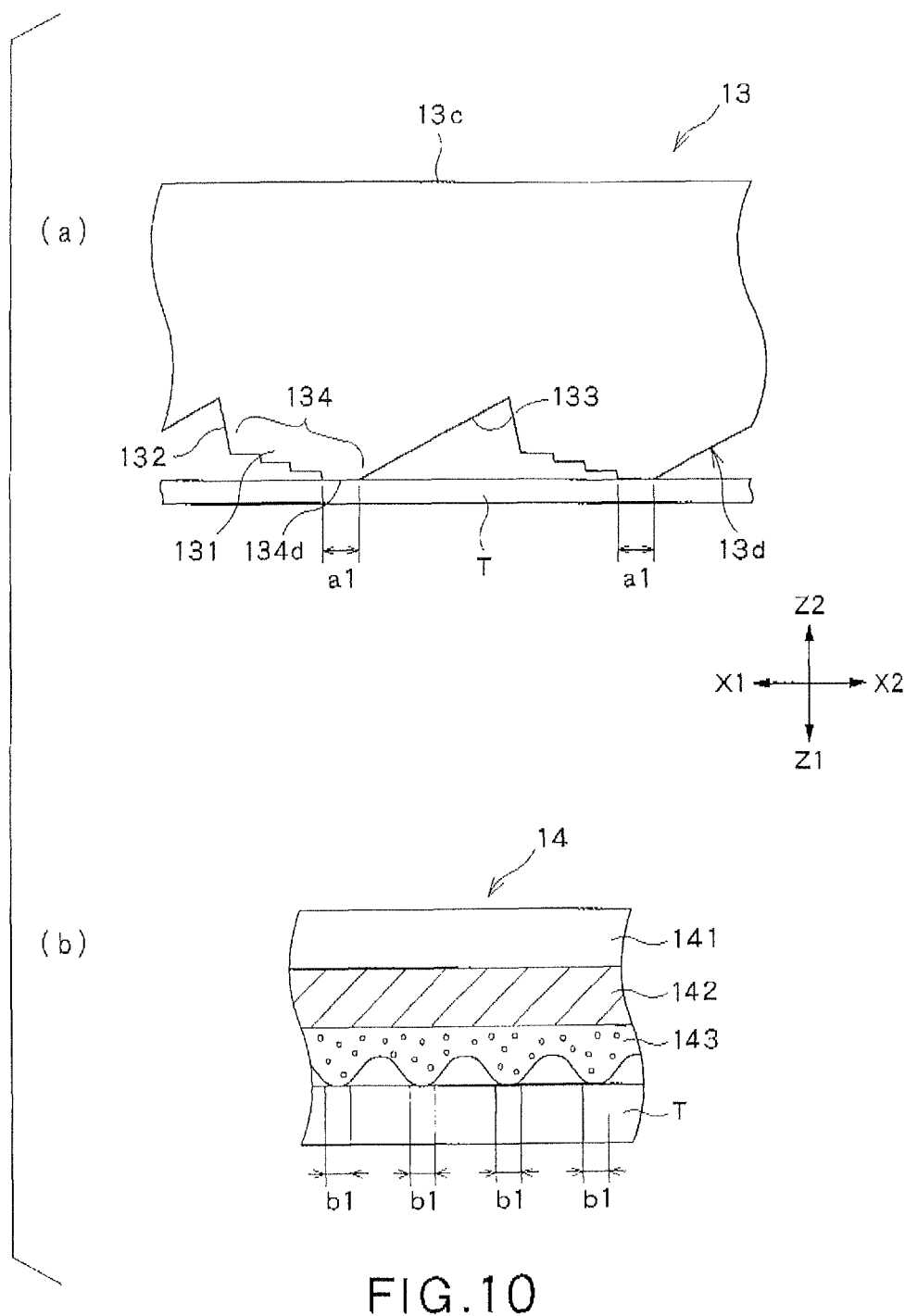
FIG. 10 shows diagrams illustrating a relationship between the contact area of a light guide plate and the contact area of a reflective sheet.

A relationship between the contact area of the light guide plate 13 and the contact area of the reflective sheet 14 will now be described with reference to FIG. 10. FIG. 10 shows diagrams illustrating the contact area of the light guide plate 13 and the contact area of the reflective sheet 14. FIG. 10(a) illustrates the light guide plate 13 when it is placed on a flat plate T, and FIG. 10(b) illustrates the reflective sheet 14 when it is placed on a flat plate T.

In order to prevent the occurrence of close optical contact between the light guide plate 13 and the reflective sheet 14 and to prevent the back surface-side unit optical structures 131 from scratching the reflective sheet 14, the contact surfaces 134d of the top surface regions 134 of the back surface-side unit optical structures 131 provided in the light guide plate 13 preferably satisfy the following expression:

$$35\% \leq S1 \leq 45\% \quad (1)$$

where S1 is the ratio (A1/A2) of the total contact area (A1) of the contact surfaces 134d when the light guide plate 13 is placed, with the back surface 13d down, on the flat plate T as shown in FIG. 10(a) to the area (A2) of the back surface 13d of the light guide plate 13.

The total contact area (A1) of the contact surfaces 134d refers to the sum of the contact areas (a1) of the contact surfaces 134d of the back surface-side unit optical structures 131 arranged in the light guide direction.

The contact areas (a1) of the contact surfaces 134d refer to the contact areas of the back surface 13d of the light guide plate 13 in contact with the flat plate T, and include the areas of the contact surfaces 134d and, in addition, the areas of those portions of the light guide plate 13 which, when the light guide plate 13 is placed on the flat plate T, are compressively deformed by the own weight of the light guide plate 13 and come into contact with the flat plate T. In this embodiment the contact areas (a1) include the areas of those portions which are compressively deformed by 0.2 μm from the contact surfaces 134d in the thickness direction.

The area (A2) of the back surface 13d of the light guide plate 13 refers to the area defined by the contour of the back surface 13d when it is viewed from the back surface side in the thickness direction (Z direction) of the light guide plate 13.

Scratching of the reflective sheet 14 and the occurrence of close optical contact between the light guide plate 13 and the reflective sheet 14 can be more effectively prevented by designing the back surface-side unit optical structures 131 to satisfy the above expression (1). If S1<35%, because of the low ratio of the total contact area of the contact surfaces 134d to the area of the back surface 13d of the light guide plate 13, the width Wc of each contact surface 134d is small. Therefore, when the light guide plate 13 is superimposed on the reflective sheet 14, the light guide plate 13 can scratch the reflective sheet 14. If S1>45%, because of the high ratio of the total contact area of the contact surfaces 134d to the area of the back surface 13d of the light guide plate 13, the area of contact between the light guide plate 13 and the reflective sheet 14 is large, which can cause close optical contact between them.

In order to prevent the occurrence of close optical contact between the light guide plate 13 and the reflective sheet 14 and to prevent the back surface-side unit optical structures 131 from scratching the reflective sheet 14, the contact surfaces 134d of the top surface regions 134 of the back surface-side unit optical structures 131 provided in the light guide plate 13, and the mat layer 143 of the reflective sheet 14 preferably satisfy the following expression: $35\% \leq S1+S2 \leq 50\%$ (2)

where S2 is the ratio (B1/B2) of the total contact area (B1) of the raised portions of the surface irregularities of the mat layer 143 when the mat layer 143-side (light guide plate 13-side) surface of the reflective sheet 14 is placed on the flat plate T as shown in FIG. 10(b) to the area (B2) of the light guide plate 13-side surface of the reflective sheet 14.

The total contact area (B1) of the raised portions of the surface irregularities of the mat layer 143 refers to the sum of the contact areas (b1) of the raised portions of the fine surface irregularities provided in the mat layer 143. The contact areas (b1) of the raised portions of the surface irregularities refer to the contact areas of the light guide plate 13-side surface of the reflective sheet 14 in contact with the flat plate T, and include the areas of the tops of the raised portions of the surface irregularities of the mat layer 143 and, in addition, the areas of those portions of the raised portions of the mat layer 143 which, when the reflective sheet 14 is placed on the flat plate T, are compressively deformed by the own weight of the reflective sheet 14 and come into contact with the flat plate T. In this embodiment the contact areas (b1) include the areas of those portions which are compressively deformed by 0.2 μm from the tops of the raised portions of the mat layer 143 in the thickness direction.

The area (B2) of the light guide plate 13-side surface of the reflective sheet 14 refers to the area defined by the contour of the reflective sheet 14 when it is viewed from the light guide plate 13 side in the thickness direction (Z direction) of the reflective sheet 14.

Further, it is preferred that the above-described S2 satisfy the following expression: 0%<S2<5% (3)

The occurrence of close optical contact between the light guide plate 13 and the reflective sheet 14 can be more effectively prevented by designing the mat layer 143 of the reflective sheet 14 to satisfy the expression (3). If S2≥5%, because of the higher ratio of the total contact area of the raised portions of the surface irregularities to the area of the mat layer 143 of the reflective sheet 14, the area of contact between the light guide plate 13 and the reflective sheet 14 increases, which undesirably increases the likelihood of close optical contact between them.

As described above, in the light guide plate 13 of this embodiment, the width Wc of each contact surface 134d is constant along the light guide direction. Thus, when the light guide plate 13 is placed, with the back surface 13d down, on the flat plate T as shown in FIG. 10(a), the area of contact between each contact area 134d and the flat plate T is constant or approximately constant.

Because the area of contact between each contact area 134d and the flat plate T is constant or approximately constant, when the light guide plate 13 and the reflective sheet 14 are stacked on top of each other, the regions of contact between the contact surfaces 134d and the reflective sheet 14 can be uniformly distributed in the light guide direction. This can prevent the occurrence of close optical contact between the light guide plate 13 and the reflective sheet 14.

In order to more effectively prevent the close optical contact, the light guide plate 13 preferably satisfies the following expression:

$$S3min/S3max > 95\% \quad (4)$$

where S3 min and S3max are the minimum and the maximum of S3 which is the ratio (a1/A2) of the contact area (a1) of each contact surface 134d when the light guide plate 13 is placed on the flat plate T, the contact surface 134d lying in an effective region from which image light can reach a viewer, to the area (A2) of the back surface 13d of the light guide plate 13.

When the light guide plate 13 is viewed in the thickness direction (Z direction), the "effective region from which image light can reach a viewer" lies inside the contour of the light guide plate 13 and has a size which is not less than 90% of the size of the contour of the light guide plate 13.

By designing the light guide plate 13 to satisfy the above expression (4), variation in the contact area between the contact surfaces 134d can be reduced. This makes it possible to more uniformly distribute the regions of contact between the contact surfaces 134d and the reflective sheet 14 along the light guide direction, thereby more effectively preventing the occurrence of close optical contact between the light guide plate 13 and the reflective sheet 14.

(Evaluation of Close Optical Contact and Scratching)

One of light guide plates having different S1 values was combined with one of reflective sheets having different S2 values to prepare samples (Measurement Examples 1 to 5). The samples were evaluated for the occurrence of close optical contact between a light guide plate and a reflective sheet and scratching of the reflective sheet.

In each of the samples of the measurement Examples, a light guide plate was superimposed on the mat layer of a reflective sheet such that the back surface-side unit optical structures face the mat layer.

Figure 11:
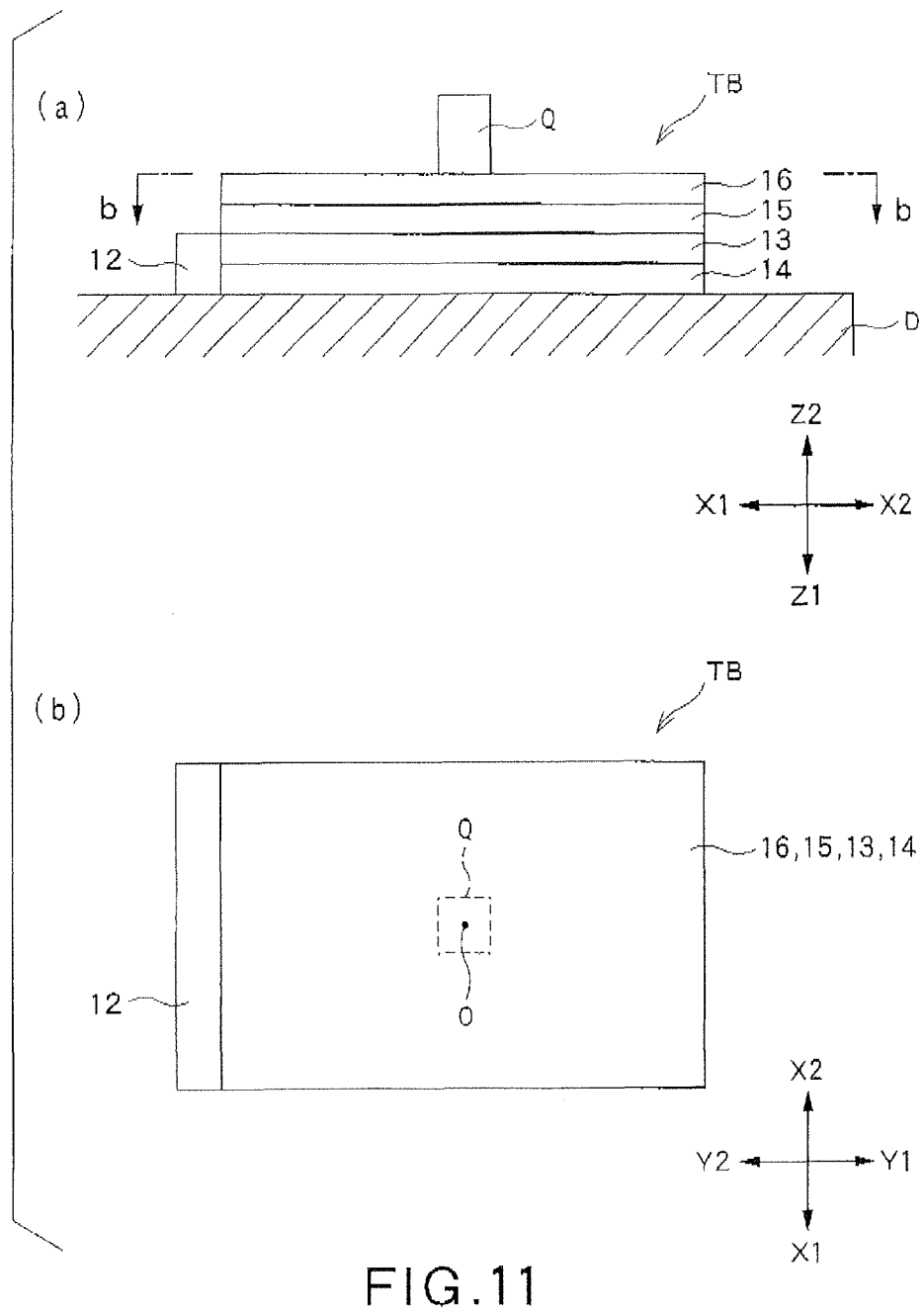
FIG. 11 shows diagrams illustrating a method (second evaluation method) for evaluating the occurrence of close optical contact between a light guide plate and a reflective sheet in the samples of Measurement Examples.

FIG. 11 shows diagrams illustrating a second evaluation method for evaluating the occurrence of close optical contact between a light guide plate and a reflective sheet in the samples of the Measurement Examples. FIG. 11(a) shows a side view of a sample, and FIG. 11(b) shows the sample as viewed in the direction of the arrow b-b of FIG. 11(a). In FIG. 11, the shapes of the light guide plate 13, the prism sheet 15, etc. are shown in a simplified manner for easier understanding.

As shown in FIG. 11, the sample TB for evaluation of close optical contact was prepared in the same manner as the actual assembling of a transmission-type display device 1: a reflective sheet, a light guide plate, a prism sheet 15 and a light diffusing sheet 16 were stacked in this order on a stage 1D, and a light source section 12 was disposed beside the light entrance surface of the light guide plate.

A weight Q was placed on the surface of the light guide plate 16 at a position which coincides with the geometric center O of the sample TB on the X-Y plane, thereby applying a load to the sample TB.

While the light source section 12 was off, the sample TB was left in the environment of 50° C. and 25% RH for 2 hours. Thereafter, the environment was changed to normal temperature and normal humidity (25° C. and 50% RH), and the light source section 12 was lit and kept on for 30 minutes. Thereafter, the weight Q was removed from the sample TB. An observer visually observed the area on which the weight Q had been placed through the light diffusing sheet 16 and the prism plate 15 at an angle of 0° with respect to the Z direction to check whether bright irregular stain-like optical defects (wet-out) was observed.

If no wet-out was observed, the sample was evaluated as "O" based on the determination of no occurrence of close optical contact. No occurrence of close optical contact was determined and evaluation "Δ" was made for a sample in which wet-out was observed, but vaguely in the area and the brightness, and which was determined to be usable as a product. Poor improvement in the prevention of close optical contact was determined and evaluation "X" was made for a sample in which wet-out, which was bright and clear in the area, was observed.

The light guide plate and the reflective sheet of each sample were evaluated for scratching in the following manner: The light guide plate was separated from the reflective sheet, and the contact areas of the respective sheets were visually checked. A sample was evaluated as "O" when no scratch was found on the light guide plate or the reflective sheet or, a scratch(es) was found, but the scratch(es) was so obscure that the sample was usable as a product. A sample was evaluated as "X" when a clear scratch(es) was found on the light guide plate or the reflective sheet.

The results of evaluation of close optical contact and scratching, made on the samples of the Measurement Examples, are summarized in Table 2 below. Referring to Table 2, the overall evaluation is "O" when the evaluation of close optical contact is "Δ" or "O", and the evaluation of scratching is "O". The overall evaluation is "Δ" when one of the evaluation of close optical contact and the evaluation of scratching is "X", though the other evaluation item is "O".

TABLE 2

| | S1 (%) | S2 (%) | Scratching | Close Optical Contact | Overall Evaluation |
|---|---|---|---|---|---|
| Measurement Example 1 | 35 | 3 | O | O | O |

TABLE 2-continued

|  | S1 (%) | S2 (%) | Scratching | Close Optical Contact | Overall Evaluation |
|---|---|---|---|---|---|
| Measurement Example 2 | 40 | 7 | ○ | Δ | ○ |
| Measurement Example 3 | 40 | 3 | ○ | ○ | ○ |
| Measurement Example 4 | 50 | 3 | ○ | X | Δ |
| Measurement Example 5 | 10 | 3 | X | ○ | Δ |

The S1 and S2 of the samples which were evaluated for close optical contact and scratching are as follows:
Sample of Measurement Example 1: S1=35%, S2=3%
Sample of Measurement Example 2: S1=40%, S2=7%
Sample of Measurement Example 3: S1=40%, S2=3%
Sample of Measurement Example 4: S1=50%, S2=3%
Sample of Measurement Example 5: S1=10%, S2=3%

The light guide plates of the Measurement Examples have the same construction except for the different S1 values. The particulars of each light guide plate are as follows. The light guide plates of the Measurement Examples satisfy the above-described expression (4).

Light guide plate: outer size 175 mm×300 mm, made of acrylic resin, total thickness about 550 μm Back surface-side unit optical structures 131: pitch P1=100 μm, angle α=2°, angle β=70°

Light exit-side unit optical structures 135: pitch P2=50 μm, angle γ=120°

$$S3\min/S3\max=100\%$$

The reflective sheets 14 have the same construction except for the different S2 values. The particulars of each reflective sheet and other members used in this test are as follows:

Reflective layer 142: having a vapor-deposited silver film layer, a total reflectance of not less than 90% and a diffuse reflectance in the range of 0.5% to 8%

Mat layer 143: formed from a UV-curable urethane resin containing urethane beads Reflective sheet 14: outer size 175 mm×300 mm, thickness about 150 μm Prism sheet 15: 175 mm (X direction)×300 mm (Y direction), thickness about 180 μm, reverse-facing prism sheet consisting of a PET film substrate and unit prisms formed from a UV-curable acrylic resin, having a refractive index of 1.51 and an apex angle c of 66°

Light diffusing sheet 16: 175 mm (X direction)×300 mm (Y direction), thickness about 160 μm, manufactured by Sumitomo 3M Limited Weight Q: stainless-steel square prismatic member, 15 mm (X direction)×15 mm (Y direction), height 50 mm, mass 500 g As shown in Table 2, with reference to the sample of Measurement Example 4, the evaluation of scratching is "O", the evaluation of close optical contact is "X", and the overall evaluation is "Δ". In this regard, while the S2 value of the sample satisfies the above expression (3), the S1 value exceeds the upper limit (45%) of the above expression (1) and thus does not satisfy the expression (1). Thus, it is conceivable that the total contact area of the contact surfaces 134d of the light guide plate 13 is too large, resulting in a low effect of preventing close optical contact between the light guide plate and the reflective sheet. The sample of Measurement Example 4 was also found not to satisfy the above expression (2).

With reference to the sample of Measurement Example 5, the evaluation of close optical contact is "O", the evaluation of scratching is "X", and the overall evaluation is "Δ". In this regard, the S1 value of the sample is lower than the lower limit of the above expression (1). Thus, the width Wc of the contact surface of each back surface-side unit optical structure of the light guide plate is small, which may cause scratching. The sample of Measurement Example 5 was also found not to satisfy the above expression (2).

With reference to the sample of Measurement Example 2, the evaluation of scratching is "O", the evaluation of close optical contact is "Δ", and the overall evaluation is "O". While the sample does not satisfy the expression (3), it satisfies the expressions (1) and (2). Therefore, the evaluation of close optical contact is not "X" but "Δ". With reference to the samples of Measurement Examples 1 and 3, the evaluation of scratching and the evaluation of close optical contact are both "O", and the overall evaluation is "O". This verifies that close optical contact between the light guide plate and the reflective sheet can be effectively prevented by designing them to satisfy not only the expressions (1) and (2) but also the expression (3).

The evaluation results thus verify that close optical contact between the light guide plate and the reflective sheet can be significantly reduced and scratching of the reflective sheet by the light guide plate can be prevented by designing them to satisfy the expressions (1) and (2), and that the prevention of close optical contact can be more effectively achieved by designing the reflective sheet to also satisfy the expression (3).

Because the light guide plate 13 and the reflective sheet 14 satisfy the expression (1), the surface source device 10 according to this embodiment can prevent the occurrence of close optical contact between the light guide plate and the reflective sheet and, in addition, can prevent scratching of the reflective sheet when the light guide plate is superimposed on the reflective sheet.

Because the expression (2) is satisfied, the surface source device 10 can more effectively achieve the optical contact prevention effect and the scratching prevention effect.

Because the contact surfaces 134d of the back surface-side unit optical structures 131 satisfy the expression (4), the regions of contact between the reflective sheet 14 and the light guide plate 13 can be uniformly distributed along the light guide direction. This also can effectively prevent the occurrence of close optical contact between the light guide plate 13 and the reflective sheet 14.

Further, because the reflective sheet 14 satisfies the expression (3), the surface source device 10 can more effectively achieve the optical contact prevention effect.

(Variations)

The present invention is not limited to the embodiments described above, but is capable of various changes and modifications within the scope of the inventive concept as expressed herein.

(1) Provided that the back surface-side unit optical structures 131 are arranged in the light guide direction (X direction) and have the above-described shape in a cross-section parallel to both the light guide direction and the normal direction of the light guide plate 13, they may have the shape of (discrete) islands discontinuous in a direction (Y direction) perpendicular to the light guide direction.

For example, it is possible to use the back surface-side unit optical structures 131 which are arranged in the light guide direction (X direction), have a generally trapezoidal shape in a cross-section parallel to both the light guide direction and the normal direction of the light guide plate 13, and consist of discrete divisions that are discontinuous in a direction (Y direction) perpendicular to the light guide direction and extending in the plate plane of the light guide plate.

(2) In the surface source device 10, an additional light source section 12 may be disposed at a position facing the opposing surface 13b that serves as a second light entrance surface 13b. In that case, it is preferred that the back surface-side unit optical structures 131 have the same construction as in the above-described embodiment in a first region from the light entrance surface 13a to the middle of the light guide plate, and have the opposite construction in a second region from the middle to the opposing surface 13b, and that in the second region the ratio Wb/W1 of a back surface-side unit optical structure 131 decreases (the ratio Wa/W1 increases) with distance of the back surface-side unit optical structure 131 from the light entrance surface 13a. Thus, in a cross-section parallel to the X-Z plane, the construction of the back surface of the light guide plate 13 is symmetrical with respect to a line passing through a midpoint in the light guide direction of the light guide plate 13 and extending in the Z direction.

(3) The pitch P1 of the back surface-side unit optical structures 131 may vary stepwise or continuously in the arrangement direction.

The angle α may vary stepwise or continuously in the arrangement direction of the back surface-side unit optical structures 131. The angles α, β, the pitch P1, etc. may be set arbitrarily to obtain good optical performance.

(4) In the above-described embodiment, the pitch P2 of the light exit-side unit optical structures 135 is equal to the width W2 of each light exit-side unit optical structure 135 in the arrangement direction. However, the pitch P2 of the light exit-side unit optical structures 135 may be made larger than the width W2 of each light exit-side unit optical structure 135 in the arrangement direction; and a flat or recessed area may be provided between two adjacent light exit-side unit optical structures 135.

The same holds true for the back surface-side unit optical structures 131.

(5) The light guide plate 13 may be designed such that the total thickness of the light guide plate 13 decreases with distance from the light entrance surface along the X direction.

(6) In the above-descried embodiment, the reflective layer 142 of the reflective sheet 14 includes a metal film layer of e.g. silver, having a high reflectance, formed by vapor deposition. However, provided that the reflection properties (total reflectance not less than 90%, diffuse reflectance 0.5% to 8%) are satisfied, the reflective layer 142 may be comprised of e.g. a reflecting/deflecting film having a multi-layer structure.

(7) Though the reflective sheet 14 is disposed on the side of the back surface of the light guide plate 13 in the above-described surface source device 10, the present invention is not limited to such a construction. For example, it may be the inner surface of a chassis of the transmission-type display device 1 that faces the back surface 13d of the light guide plate 13. A light-reflecting coating, a metal foil, or the like may be formed, by coating or transfer, on the back surface 13d-facing inner surface of the chassis.

The embodiments and variations described above may be combined in an appropriate manner, though a detailed description thereof is omitted. It is understood that the present invention is not limited to the embodiments described above.

What is claimed is:

1. A light guide plate configured to allow light to enter through a light entrance surface, and allow the light to exit through a light exit surface while guiding the light in a light guide direction, comprising: a light entrance surface through which light enters; a light exit surface extending in a direction intersecting the light entrance surface and through which light exits; and a back surface that opposes the light exit surface, wherein a plurality of back surface-side unit optical structures are arranged in the back surface along the light guide direction, wherein each back surface-side unit optical structure is tapered in a direction away from the light exit surface, and has a first inclined surface lying on the light entrance surface side, a second inclined surface lying opposite the first inclined surface and which totally reflects at least part of incident light, and a top surface region lying between the first inclined surface and the second inclined surface, and located farthest from the light exit surface, and wherein in at least part of the back surface-side unit optical structures, the top surface regions each include a plurality of surfaces which are parallel to the light exit surface and have different heights in the direction away from the light exit surface, wherein the plurality of surfaces of each top surface region are arranged in the arrangement direction of the back surface-side unit optical structures, and wherein the surface, located closest to the first inclined surface, has the smallest height in the direction away from the light exit surface, and the height of each surface increases with distance of the surface from the first inclined surface.

2. The light guide plate according to claim 1, wherein each back surface-side unit optical structure has a generally quadrangular cross-sectional shape in a cross-section parallel to both the arrangement direction of the back surface-side unit optical structures and the thickness direction of the light guide plate.

3. The light guide plate according to claim 1, wherein the following expression is satisfied: $0.09 \leq Wc/P1 \leq 0.40$ where Wc is the size, in the arrangement direction of the back surface-side unit optical structures, of a surface which is one of the plurality of surfaces of each top surface region and which has the largest height in the direction away from the light exit surface, and P1 is the pitch of the back surface-side unit optical structures.

4. The light guide plate according to claim 3, wherein the surface having the largest height in the direction away from the light exit surface constitutes a contact region which is to make contact with a reflective member disposed on the side of the back surface of the light guide plate.

5. The light guide plate according to claim 1, wherein the light entrance surface consists of a single surface, wherein the first inclined surface lies in an area on which light, traveling in the light guide direction from the light entrance surface, does not fall, and wherein the top surface region has a step-like configuration.

6. The light guide plate according to claim 1, wherein the back surface-side unit optical structures each have a columnar shape and are arranged in the light guide direction, with the longitudinal direction being perpendicular to the light guide direction.

7. The light guide plate according to claim 1, wherein the ratio Wb/W1, i.e. the ratio of the total size Wb of the first inclined surface and the second inclined surface in the arrangement direction of the back surface-side unit optical structures to the size W1 of each back surface-side unit optical structure in the arrangement direction of the back surface-side unit optical structures, increases with distance of the back surface-side unit optical structure from the light entrance surface.

8. A surface source device comprising: the light guide plate according to claim 1; and a reflective member, disposed on the side of the back surface of the light guide plate, for reflecting light, which has exited the light guide plate through the back surface, back toward the light guide plate, wherein the reflective member has fine surface irregularities in a light guide plate-side surface, and has a total reflectance of not less than 90% and a diffuse reflectance in the range of 0.5% to 8%, wherein the top surface region, in at least part thereof, includes a contact region to make contact with the reflective member, and wherein the light guide plate satisfies the following expression: $35\% \leq S1 \leq 45\%$ where S1 is the ratio of the total contact area of the contact regions when the back surface of the light guide plate is placed on a flat plate to the area of the back surface of the light guide plate.

9. The surface source device according to claim 8, wherein the following expression is satisfied: $35\% \leq S1+S2 \leq 50\%$ where S2 is the ratio of the total contact area of the raised portions of the surface irregularities of the reflective member when the light guide plate-side surface of the reflective member is placed on a flat plate to the area of the light guide plat-side surface of the reflective member.

10. The surface source device according to claim 9, wherein the following expression is satisfied: $0\% < S2 < 5\%$.

11. The surface source device according to claim 8, wherein the following expression is satisfied: $S3\,min/S3max > 95\%$ where S3 min and S3max are the minimum and the maximum of S3 which is the ratio of the contact area of each contact region when the light guide plate is placed on a flat plate, the contact region lying in an effective region from which light can reach a viewer, to the area of the back surface of the light guide plate.

12. The surface source device according to claim 8, further comprising a light source section, provided at a position facing the light entrance surface of the light guide plate, for projecting light onto the light entrance surface; and a deflecting optical sheet provided on the side of the light exit surface of the light guide plate and having the effect of deflecting light, which has exited the light guide plate, into the normal direction of the sheet plane or a direction which makes a small angle with the normal direction.

13. A transmission-type display device comprising: the surface source device according to claim 12; and a transmissive display to be illuminated from the back by the surface source device.

* * * * *